(12) United States Patent
Cheng

(10) Patent No.: US 10,327,015 B2
(45) Date of Patent: Jun. 18, 2019

(54) PICTURE COMBINING METHOD, TERMINAL, AND PICTURE COMBINING SYSTEM

(71) Applicant: Tencent Technology (Shenzhen) Company Limited, Shenzhen (CN)

(72) Inventor: Pei Cheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 82 days.

(21) Appl. No.: 15/721,877

(22) Filed: Sep. 30, 2017

(65) Prior Publication Data
US 2018/0027268 A1 Jan. 25, 2018

Related U.S. Application Data

(63) Continuation-in-part of application No. PCT/CN2016/085748, filed on Jun. 14, 2016.

(30) Foreign Application Priority Data

Jul. 23, 2015 (CN) .......................... 2015 1 0435710

(51) Int. Cl.
*H04L 12/58* (2006.01)
*H04N 21/234* (2011.01)
(Continued)

(52) U.S. Cl.
CPC ....... *H04N 21/23406* (2013.01); *G06F 16/00* (2019.01); *G06Q 50/01* (2013.01);
(Continued)

(58) Field of Classification Search
CPC ........ G06Q 10/10; G06Q 50/01; H04L 51/08; H04L 51/14; H04L 12/4625; H04L 29/08;
(Continued)

(56) References Cited

U.S. PATENT DOCUMENTS 8,898,567 B2 * 11/2014 Arrasvuori ............ G06F 1/1626
715/704
9,154,845 B1 * 10/2015 Abboa-Offei ...... H04N 21/4788
(Continued)

FOREIGN PATENT DOCUMENTS

CN 102209044 A 10/2011
CN 102930522 A 2/2013
(Continued)

OTHER PUBLICATIONS

Tencent Technology, ISRWO, PCT/cn2016/085748, dated Aug. 26, 2016, 9 pgs.
(Continued)

*Primary Examiner* — Howard D Brown, Jr.
(74) *Attorney, Agent, or Firm* — Morgan, Lewis & Bockius LLP

(57) ABSTRACT

A method for creating a collage among members of a chat group of a social networking application is performed at a terminal, comprising: generating a first collage using a user-selected collage template after receiving a user-selected picture for a predefined location in the user-selected collage template; generating a configuration file used for describing the first collage; and submitting the first collage and the configuration file to the social networking application, wherein the social networking application is configured to forward the first collage and the configuration file to another member of the chat group when there are one or more blank sections in the first collage and the other member of the chat group is configured to update the first collage by adding at least one picture to one of the one or more blank sections until there is no blank section in the first collage.

19 Claims, 19 Drawing Sheets

(51) Int. Cl.
  *G06F 16/00* (2019.01)
  *G06T 5/50* (2006.01)
  *G06T 3/40* (2006.01)
  *H04L 29/08* (2006.01)
  *G06Q 50/00* (2012.01)
  *H04L 12/46* (2006.01)

(52) U.S. Cl.
  CPC .............. *G06T 3/40* (2013.01); *G06T 3/4038* (2013.01); *G06T 5/50* (2013.01); *H04L 12/4625* (2013.01); *H04L 29/08* (2013.01); *H04L 67/06* (2013.01)

(58) Field of Classification Search
  CPC ... H04L 67/06; H04N 21/23406; G06F 16/00; G06T 3/4038; G06T 3/40; G06T 5/50
  See application file for complete search history.

(56) References Cited

U.S. PATENT DOCUMENTS

| | | | |
|---|---|---|---|
| 9,235,268 B2* | 1/2016 | Arrasvuori | G06F 3/017 |
| 9,854,317 B1* | 12/2017 | Abboa-Offei | H04N 21/4788 |
| 10,021,059 B1* | 7/2018 | Rao | H04L 51/32 |
| 2006/0123127 A1* | 6/2006 | Littlefield | G06Q 10/107 709/229 |
| 2012/0268611 A1 | 10/2012 | Kimijima et al. | |
| 2015/0143256 A1* | 5/2015 | Panchawagh-Jain | H04L 51/08 715/752 |
| 2015/0244837 A1* | 8/2015 | Jadhav | H04L 12/6418 709/203 |
| 2017/0126786 A1* | 5/2017 | Satkunarajah | G06F 3/04817 |

FOREIGN PATENT DOCUMENTS

| | | |
|---|---|---|
| CN | 102930523 A | 2/2013 |
| CN | 104468338 A | 3/2015 |

OTHER PUBLICATIONS

Tencent Technology, IPRP, PCT/cn2016/085748, dated Jan. 23, 2018, 7 pgs.

* cited by examiner

If the type of the target collage template is the fixed-value template type, the receiver client adds the at least one picture to the blank section, to obtain the second collage, where a quantity of the added at least one picture is less than or equal to a quantity of the blank sections — 4071

If the type of the target collage template is the nonfixed-value template type, the receiver client adds a blank section to the target collage template, and adds the at least one picture to the blank section, to obtain the second collage, where a total quantity of sections in the target collage template after the blank section is added is less than or equal to a preset threshold — 4072

FIG. 4-8

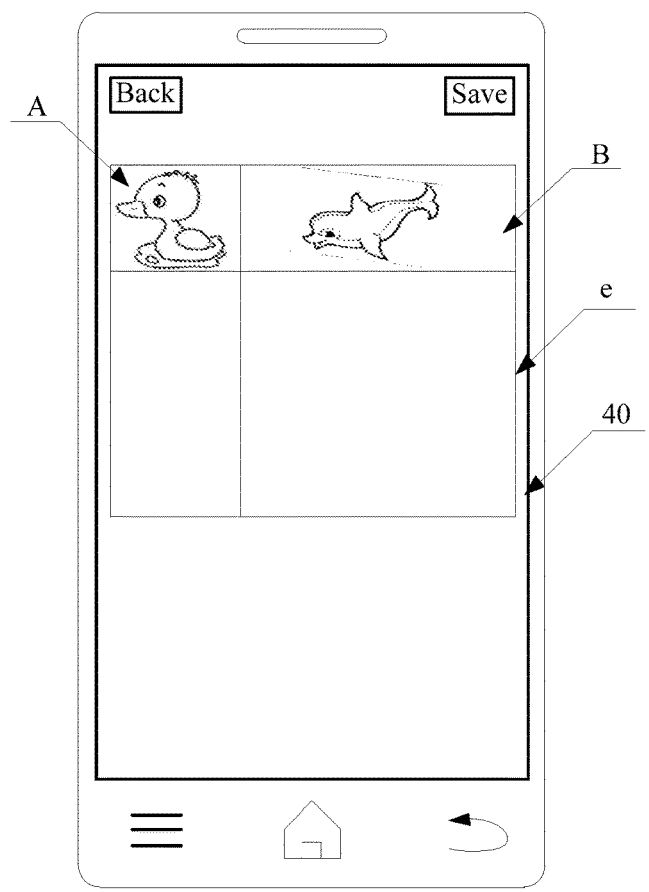

FIG. 4-9

PICTURE COMBINING METHOD, TERMINAL, AND PICTURE COMBINING SYSTEM

RELATED APPLICATIONS

This application is a continuation-in-part of PCT Patent Application No. PCT/CN2016/085748, entitled "PICTURE SPLICING METHOD, TERMINAL, AND SYSTEM" filed on Jun. 14, 2016, which claims priority to Chinese Patent Application No. 201510435710.1, filed with the State Intellectual Property Office of the People's Republic of China on Jul. 23, 2015, and entitled "PICTURE COMBINING METHOD, APPARATUS, AND SYSTEM", both of which are incorporated herein by reference in their entirety.

FIELD OF THE TECHNOLOGY

Embodiments of the present application relate to the field of application of electronic technologies, and in particular, to a picture combining method, a terminal, and a picture combining system.

BACKGROUND OF THE DISCLOSURE

With the popularization of intelligent terminals such as mobile phones and tablet computers, image processing applications based on intelligent terminals are becoming increasingly popular, and the image processing applications usually have a picture combining function.

In related technologies, when a user uses an image processing application to combine pictures, the user first opens the image processing application on an intelligent terminal. The intelligent terminal may acquire at least one picture by using a photographing function of the image processing application, or acquire at least one picture from a photo album on the intelligent terminal. Subsequently, the user may select one of collage templates provided by the image processing application. The intelligent terminal may use, according to a selection signal triggered when the user selects the collage template, the collage template selected by the user as a target collage template. The intelligent terminal adjusts, according to an adjustment signal that is triggered in the target collage template by the user and is used for the at least one picture, a position of the at least one picture in the target collage template, to obtain a collage. Subsequently, the user may trigger a sharing signal. The intelligent terminal may share, according to the sharing signal, the collage to a social-networking-information sharing platform corresponding to the image processing application.

In a process of implementing the present disclosure, the inventor finds that related technologies have at least the following problems: After a user shares a collage to a social-networking-information sharing platform, another user may download the collage locally. The another user uses the collage as one picture, and uses an image processing application to select a new collage template, so as to combine again the collage and a picture that needs to be added to the collage. Therefore, for related technologies, the flexibility of picture combining is relatively low, and an effect of a collage formed through picture combining is monotonous.

SUMMARY

To resolve problems in related technologies that the flexibility of picture combining is relatively low and an effect of a collage formed through picture combining is monotonous, embodiments of the present application provide a picture combining method, a terminal, and a picture combining system. The technical solutions are as follows:

According to a first aspect of an embodiment of the present application, a method for creating a collage among members of a chat group of a social networking application is performed at a terminal having one or more processors, a display, and memory storing a plurality of programs including an image processing application associated with the social networking application, and the method comprising:

detecting a request from a user of the terminal for creating a collage, wherein the user is a member of the chat group of the social networking application;

in response to the user request, rendering a graphical user interface on the display of the terminal, the graphical user interface including a plurality of candidate collage templates;

detecting a user selection of one of the candidate collage templates;

in response to the user selection, rendering the user-selected collage template in the graphical user interface;

generating a first collage using the user-selected collage template after receiving a user-selected picture for a pre-defined location in the user-selected collage template;

generating a configuration file used for describing the first collage; and submitting the first collage and the configuration file to the social networking application, wherein the social networking application is configured to forward the first collage and the configuration file to another member of the chat group when there are one or more blank sections in the first collage and the other member of the chat group is configured to update the first collage by adding at least one picture to one of the one or more blank sections until there is no blank section in the first collage.

According to a second aspect of an embodiment of the present application, a terminal for creating a collage among members of a chat group of a social networking application has one or more processors, a display, memory and a plurality of programs including an image processing application associated with the social networking application for performing the aforementioned method.

According to a third aspect of an embodiment of the present application, a non-transitory computer storage medium in connection with a terminal having one or more processors and a display, stores a plurality of programs that, when executed by the one or more processors, cause the terminal to perform the aforementioned method.

Beneficial effects brought by the technical solutions provided in the embodiments of the present application are as follows:

For the picture combining method, the terminal, and the picture combining system provided in the embodiments of the present application, a receiver client in an image processing application acquires a configuration file that is provided by a sender client and is used for describing a first collage, and acquires the first collage according to the configuration file; detects whether a blank section exists in a target collage template for forming the first collage; and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

FIG. 4-1 is a method flowchart of a picture combining method provided in still another embodiment of the present application;

FIG. 4-2 is a method flowchart of a sender client acquiring a first collage provided in the embodiment shown in FIG. 4-1;

FIG. 4-3 is an interface diagram of a target collage template displayed by the sender client provided in the embodiment shown in FIG. 4-1;

FIG. 4-4 is an interface diagram obtained after the sender client adds one picture to the target collage template provided in the embodiment shown in FIG. 4-1;

FIG. 4-5 is a method flowchart of the sender client uploading a configuration file to a social-networking-information sharing platform corresponding to an image processing application provided in the embodiment shown in FIG. 4-1;

FIG. 4-6 is a method flowchart of a receiver client detecting whether a blank section exists in the target collage template for forming the first collage provided in the embodiment shown in FIG. 4-1;

FIG. 4-7 is a method flowchart of the receiver client determining whether a blank section exists in the target collage template for forming the first collage provided in the embodiment shown in FIG. 4-1;

FIG. 4-8 is a method flowchart of the receiver client adding at least one picture to the blank section provided in the embodiment shown in FIG. 4-1;

FIG. 4-9 is an interface diagram obtained after the receiver client adds at least one picture to a blank section in the target collage template for forming the first collage shown in FIG. 4-4 to obtain a second collage;

FIG. 4-10 is an interface diagram of the first collage when a type of the target collage template is a nonfixed-value template type provided in the embodiment shown in FIG. 4-1;

FIG. 4-11 is an interface diagram obtained after the receiver client adds a blank section to the target collage template shown in FIG. 4-10 provided in the embodiment shown in FIG. 4-1;

FIG. 4-12 is an interface diagram obtained after the receiver client adds at least one picture to the blank section shown in FIG. 4-11 provided in the embodiment shown in FIG. 4-1;

FIG. 4-13 is an interface diagram obtained after the receiver client adds at least one picture to a blank section in the target collage template for forming the second collage shown in FIG. 4-9 to obtain a third collage;

FIG. 5 is a schematic structural diagram of a picture combining apparatus provided in an embodiment of the present application;

FIG. 6-1 is a schematic structural diagram of a picture combining apparatus provided in another embodiment of the present application;

FIG. 6-2 is a schematic structural diagram of a first acquisition module provided in the embodiment shown in FIG. 6-1;

FIG. 6-3 is a schematic structural diagram of a detection module provided in the embodiment shown in FIG. 6-1;

FIG. 7-1 is a schematic structural diagram of a picture combining apparatus provided in still another embodiment of the present application;

FIG. 7-2 is a schematic structural diagram of a providing module provided in the embodiment shown in FIG. 7-1;

FIG. 8 is a schematic structural diagram of a terminal provided in an embodiment of the present application;

FIG. 9 is a schematic structural diagram of a terminal provided in another embodiment of the present application; and FIG. 10 is a schematic structural diagram of a picture combining system provided in an embodiment of the present application.

The accompanying drawings herein are incorporated in this specification, constitute a part of this specification, and show embodiments that meet the present disclosure. The accompanying drawings and this specification are used together for describing the principle of the present disclosure.

DESCRIPTION OF EMBODIMENTS

To make the objectives, technical solutions, and advantages in the present disclosure clearer, the following further describes the present disclosure in detail with reference to the accompanying drawings. It is obvious that the embodiments to be described are only a part rather than all of the embodiments of the present application. All other embodiments obtained by a person of ordinary skill in the art based on the embodiments of the present application without creative efforts shall fall within the protection scope of the present disclosure.

Figure 1:
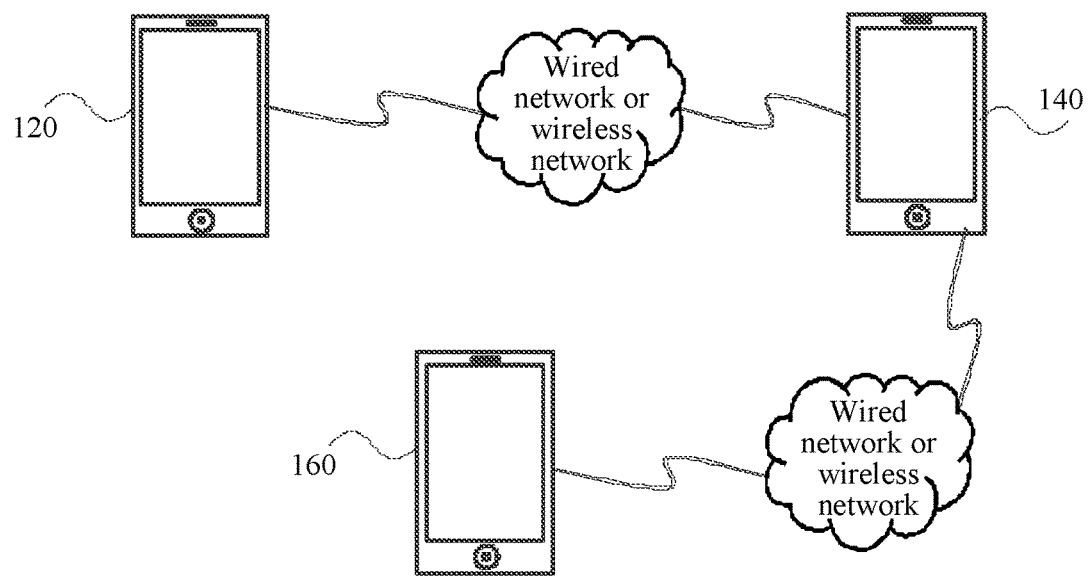
FIG. 1 is a schematic diagram of an implementation environment in which a picture combining method provided in embodiments of the present application is applied.

FIG. 1 is a schematic diagram of an implementation environment in which a picture combining method provided in embodiments of the present application is applied. Referring to FIG. 1, the implementation environment at least includes: a first terminal 120, a second terminal 140, and a third terminal 160. The second terminal 140 may be respectively connected to the first terminal 120 and the third terminal 160 by using a wired network or a wireless network, and the first terminal 120 and the third terminal 160 may also be connected by using a wired network or a wireless network (not shown in FIG. 1). The wireless network may include, but is not limited to, a WIreless-FIdelity (WIFI) network, a Bluetooth network, an infrared network, and a data network.

A client in an image processing application may run on the first terminal 120, the second terminal 140, and the third terminal 160. The client in the image processing application can implement a picture combining function. For example, the first terminal 120, the second terminal 140, and the third terminal 160 may all be smartphones, tablet computers, electronic book readers, Moving Picture Experts Group Audio Layer III (MP3) players, Moving Picture Experts Group Audio Layer IV (MP4) players or laptop computers, desktop computers, and the like. The first terminal 120, the second terminal 140, and the third terminal 160 may be the same or may be different. This is not limited in this implementation environment.

The client that is in the image processing application and runs on the first terminal 120 may be a sender client. The sender client may acquire a first collage, generate a configuration file used for describing the first collage, and provide the configuration file to at least one receiver client in the image processing application. The acquiring, by the sender client, a first collage may include: selecting, by the sender client, a target collage template from a collage template library of the image processing application, and adding at least one picture to the target collage template to obtain the first collage. In some embodiments, before adding the at least one picture to the target collage template, the sender client may perform pre-processing on the at least one picture, and add the pre-processed at least one picture to the target collage template. The pre-processing may include at least one of beauty retouching, filter applying, and sharpening. Alternatively, the acquiring, by the sender client, a first collage may further include: receiving, by the sender client, the first collage sent by another client. This is not limited in this implementation environment.

A manner in which the sender client provides the configuration file to the at least one receiver client in the image processing application may include, but is not limited to: sending the configuration file to the at least one receiver client in a manner of an instant message; or, sending the configuration file in a manner of a group message to the at least one receiver client that is in the image processing application and belongs to a same group; or, uploading the configuration file to a social-networking-information sharing platform corresponding to the image processing application, where information on the social-networking-information sharing platform corresponding to the image processing application is viewed by a receiver client that has a predetermined relationship with the sender client and has an access right, and the predetermined relationship may be a relationship such as Friend, Subscription, and Follow.

In some embodiments, when uploading the configuration file to the social-networking-information sharing platform corresponding to the image processing application, the sender client may add description information to the first collage, and upload the configuration file and the description information of the first collage to the social-networking-information sharing platform corresponding to the image processing application.

In some embodiments, the configuration file provided by the sender client to the at least one receiver client may include a type identifier of the target collage template and a position identifier of the at least one picture in the target collage template in the first collage. The type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold.

The client that is in the image processing application and runs on the second terminal 140 may be a receiver client. The receiver client may be any receiver client of the at least one receiver client corresponding to the first terminal 120. The receiver client may acquire the configuration file provided by the sender client; acquire the first collage according to the configuration file; detect whether a blank section exists in the target collage template for forming the first collage; and when a blank section exists in the target collage template for forming the first collage, add at least one picture to the blank section, to obtain a second collage. The blank section is a section that is not occupied by a picture. A manner in which the receiver client acquires the configuration file provided by the sender client may include, but is not limited to: receiving the configuration file sent in a manner of an instant message by the sender client; or, receiving the configuration file sent in a manner of a group message by the sender client; or, receiving the configuration file uploaded by the sender client to the social-networking-information sharing platform corresponding to the image processing application.

In some embodiments, the configuration file includes a type identifier of the target collage template and a position identifier of the at least one picture in the target collage template in the first collage. The type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold. Therefore, the receiver client may determine, according to the type identifier of the target collage template, the type of the target collage template for forming the first collage; and determine, according to the type of the target collage template for forming the first collage and a quantity of position identifiers in the first collage, whether a blank section exists in the target collage template for forming the first collage.

Specifically, if the type of the target collage template is the fixed-value template type, the receiver client may determine whether the quantity of position identifiers in the first collage is less than a fixed value. If the quantity of position identifiers in the first collage is less than the fixed value, the receiver client determines that a blank section exists in the target collage template for forming the first collage. If the type of the target collage template is the nonfixed-value template type, the receiver client may determine whether the quantity of position identifiers in the first collage is less than a preset threshold. If the quantity of position identifiers in the first collage is less than the preset threshold, the receiver client determines that a blank section exists in the target collage template for forming the first collage.

In some embodiments, if the type of the target collage template is the fixed-value template type, the receiver client may add the at least one picture to the blank section, to obtain the second collage, where a quantity of the added at least one picture is less than or equal to a quantity of the blank sections. If the type of the target collage template is the nonfixed-value template type, the receiver client may add a blank section to the target collage template, and add at least one picture to the blank section, to obtain the second collage, where a total quantity of sections in the target collage template after the blank section is added is less than or equal to a preset threshold.

In some embodiments, after obtaining the second collage, the receiver client may provide, to at least one remaining receiver client, a configuration file used for describing the second collage, where the remaining receiver client includes the sender client. In some embodiments, this implementation environment is described by using an example in which the remaining receiver client is the client that is in the image processing application and runs on the third terminal 160. After obtaining the second collage, the receiver client may provide, to the client that is in the image processing application and is on the third terminal 160, a configuration file used for describing the second collage. After obtaining the second collage, the receiver client may send, to the sender client, prompt information used for indicating that the first collage is changed.

The client that is in the image processing application and is installed on the third terminal 160 may be a remaining receiver client. The receiver client may be the at least one receiver client corresponding to the second terminal 140. A process in which the client that is in the image processing application and is installed on the third terminal 160 processes the second collage is similar to a process in which the second terminal 140 processes the first collage. This is no longer described herein in this implementation environment.

Figure 2:
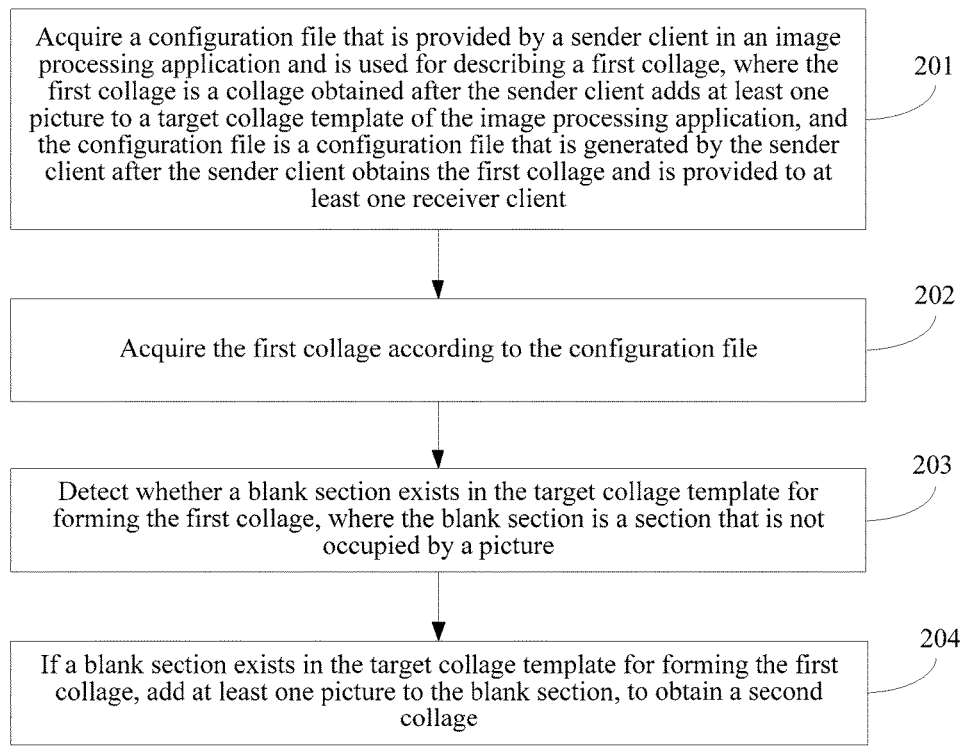
FIG. 2 is a method flowchart of a picture combining method provided in an embodiment of the present application.

FIG. 2 is a method flowchart of a picture combining method provided in an embodiment of the present application. This embodiment is described by using an example in which the picture combining method is applied to a receiver client in an image processing application. The receiver client may be a client installed on the second terminal 140 in the implementation environment shown in FIG. 1. Referring to FIG. 2, the method procedure may include the following operations:

Operation 201: Acquire a configuration file that is provided by a sender client in the image processing application and is used for describing a first collage, where the first collage is a collage obtained after the sender client adds at least one picture to a target collage template of the image processing application, and the configuration file is a configuration file that is generated by the sender client after the sender client obtains the first collage and is provided to at least one receiver client.

Operation 202: Acquire the first collage according to the configuration file.

Operation 203: Detect whether a blank section exists in the target collage template for forming the first collage, where the blank section is a section that is not occupied by a picture.

Operation 204: If a blank section exists in the target collage template for forming the first collage, add at least one picture to the blank section, to obtain a second collage.

In conclusion, for the picture combining method provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

Figure 3:
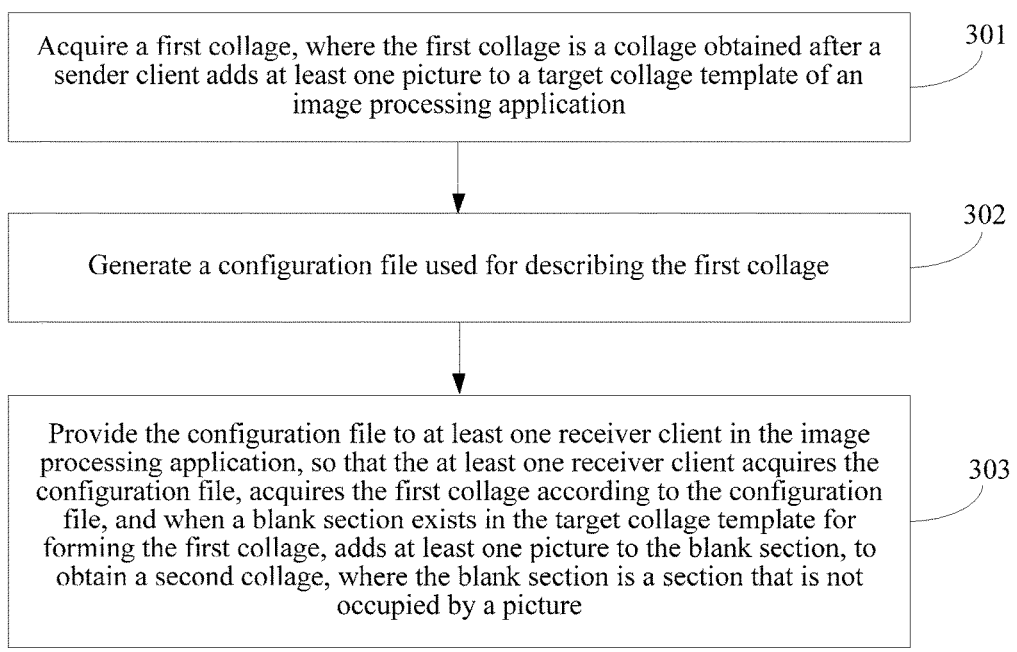
FIG. 3 is a method flowchart of a picture combining method provided in another embodiment of the present application.

FIG. 3 is a method flowchart of a picture combining method provided in another embodiment of the present application. This embodiment is described by using an example in which the picture combining method is applied to a sender client in an image processing application. The sender client may be a client installed on the first terminal 120 in the implementation environment shown in FIG. 1. Referring to FIG. 3, the method procedure may include the following operations:

Operation 301: Acquire a first collage, where the first collage is a collage obtained after the sender client adds at least one picture to a target collage template of the image processing application.

Operation 302: Generate a configuration file used for describing the first collage.

Operation 303: Provide the configuration file to at least one receiver client in the image processing application, so that the at least one receiver client acquires the configuration file, acquires the first collage according to the configuration file, and when a blank section exists in the target collage template for forming the first collage, adds at least one picture to the blank section, to obtain a second collage, where the blank section is a section that is not occupied by a picture.

In conclusion, for the picture combining method provided in this embodiment of the present application, a sender client acquires a first collage, generates a configuration file used for describing the first collage, and provides the configuration file to at least one receiver client in an image processing application, so that the at least one receiver client acquires the configuration file, acquires the first collage according to the configuration file, and when a blank section exists in a target collage template for forming the first collage, adds at least one picture to the blank section, to obtain a second collage. When determining that a blank section exists in the target collage template for forming the first collage, a receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

Figures 1, 4:
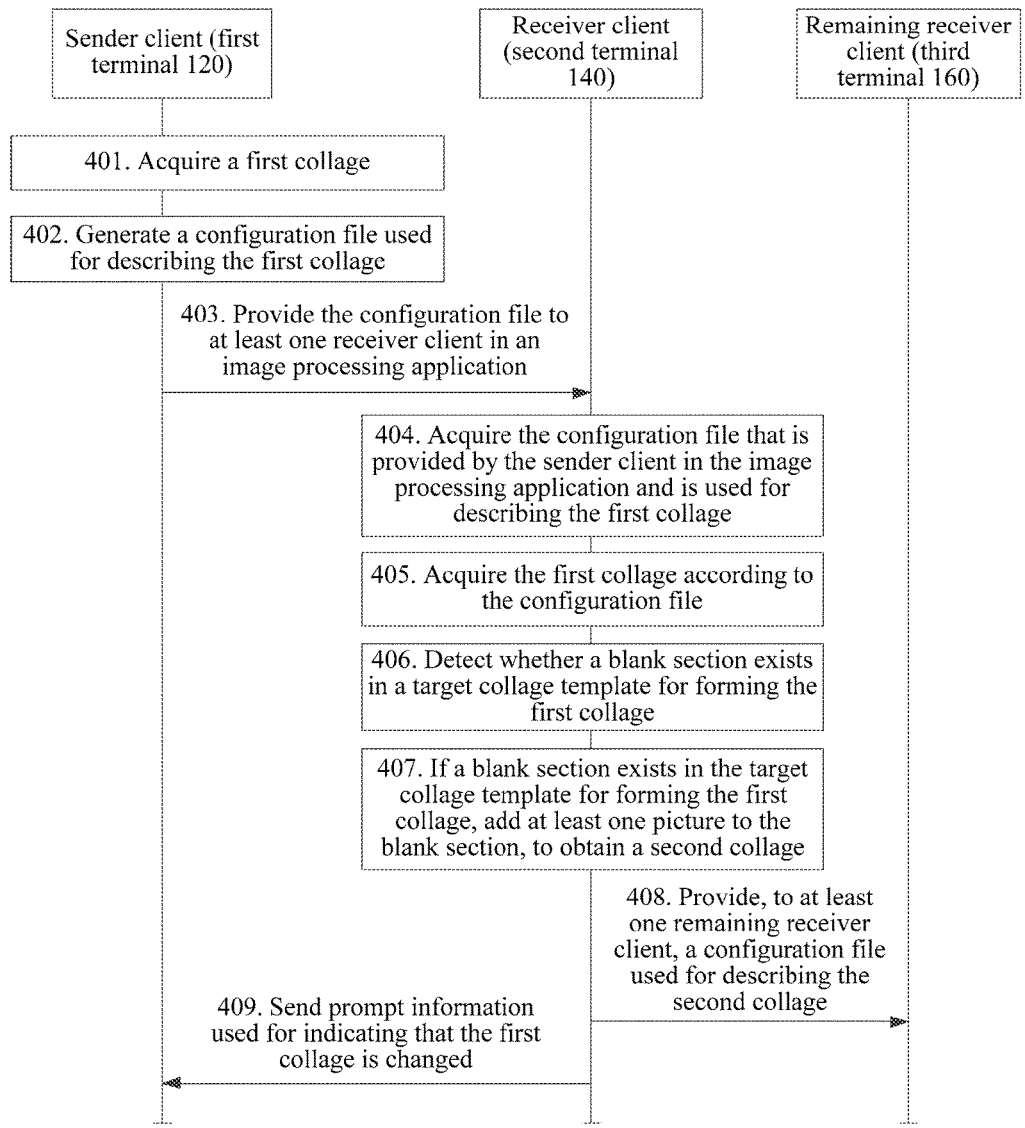
Figures 2, 4:
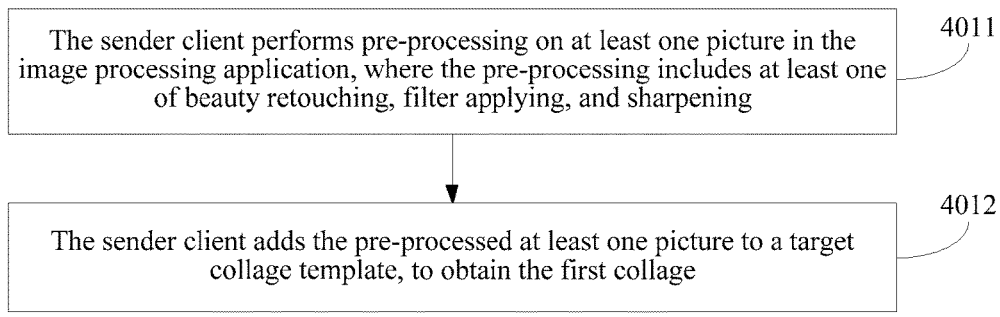
Figures 3, 4:
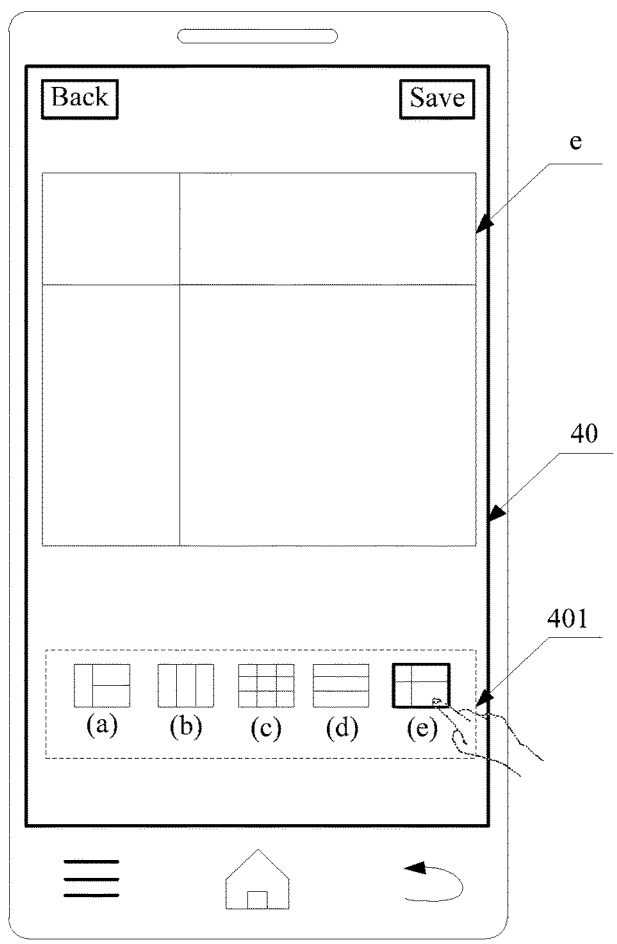
Figure 4:
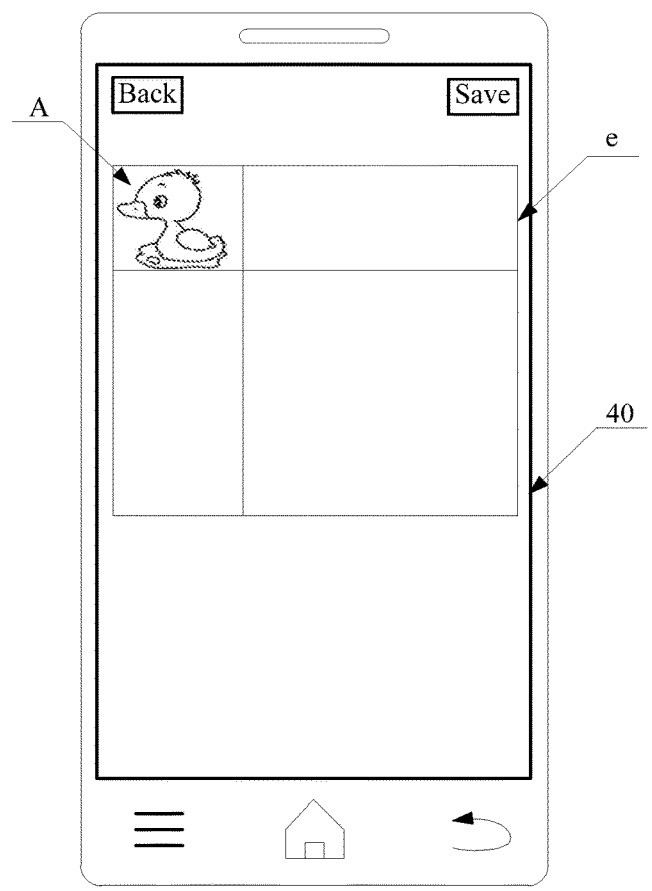

FIG. 4-1 is a method flowchart of a picture combining method provided in still another embodiment of the present application. This embodiment is described by using an example in which the picture combining method is applied to the implementation environment shown in FIG. 1. Referring to FIG. 4-1, the method procedure may include the following operations:

Operation 401: A sender client acquires a first collage.

In this embodiment of the present application, the sender client may be the client that is in the image processing application and runs on the first terminal 120 in the implementation environment shown in FIG. 1. The client may send a collage to the clients that are in the image processing application and run on the second terminal 140 and the third terminal 160. Therefore, the client is referred to as the sender client. The sender client may acquire the first collage in the following two manners:

In a first implementation, the sender client adds at least one picture to a target collage template of the image processing application to obtain the first collage. For example, referring to FIG. 4-2, FIG. 4-2 is a method flowchart of the first collage obtained after the sender client adds the at least one picture to the target collage template of the image processing application. Referring to FIG. 4-2, the method procedure may include:

Operation 4011: The sender client performs pre-processing on at least one picture in the image processing application, where the pre-processing includes at least one of beauty retouching, filter applying, and sharpening.

The at least one picture may be acquired by the sender client from a photo album on a terminal according to an operation of a user, or may be acquired by the sender client according to an operation of the user by using a photographing function of the sender client. This is not limited in this embodiment of the present application.

The sender client may perform a pre-processing operation on a picture according to an operation of the user. The sender client may execute, according to a signal triggered by the user, at least one of beauty retouching, filter applying, and sharpening. For example, if the user triggers a beauty retouching signal, the sender client performs beauty retouching on the picture according to the beauty retouching signal. If the user triggers a filter signal, the sender client applies a filter to the picture according to the filter signal. If the user triggers both a beauty retouching signal and a filter signal, the sender client performs beauty retouching on the picture according to the beauty retouching signal, and applies a filter to the picture according to the filter signal.

Operation 4012: The sender client adds the pre-processed at least one picture to a target collage template, to obtain the first collage.

The target collage template is determined by the sender client according to a selection signal of the user in a collage template library. In some embodiments, as shown in FIG. 4-3, FIG. 4-3 is an interface diagram displayed by the sender client. Referring to FIG. 4-3, the interface diagram is an interface diagram of the image processing application. An interface 40 includes a collage template library 401. The collage template library 401 includes: a template (a), a template (b), a template (c), a template (d), and a template (e). When the user clicks any collage template in the collage template library 401, a selection signal for the collage template may be triggered. The sender client determines the collage template corresponding to the selection signal as the target collage template. For example, as shown in FIG. 4-3, when the user clicks the template (e), a selection signal for the template (e) is triggered. The sender client uses the template (e) as the target collage template. In some embodiments, the interface 40 further includes a "Back" button and a "Save" button. The user may click the "Back" button to return to a previous interface of a current interface to reselect a picture.

After determining the target collage template, the sender client may add at least one picture to the target collage template, to obtain the first collage. For example, as shown in FIG. 4-4, FIG. 4-4 is a schematic diagram obtained after the sender client adds a picture A to the target collage template (e). In this case, the target collage template (e) and the picture A form the first collage. The user may click the "Save" button to save the first collage. After adding a picture, the sender client may save identifier information of the picture. For example, assuming that identifier information of the picture A is ID-A, after adding the picture A to the target collage template (e), the sender client may save the identifier information ID-A of the picture A.

In a second implementation, the sender client receives a collage sent by another client, and adds a picture to a blank section of the collage to obtain the first collage.

In this embodiment of the present application, if the client of the first terminal 120 is not a client that first performs picture combining, the sender client installed on the first terminal 120 may receive a collage sent by another client and add a picture to a blank section of the received collage to obtain the first collage. The blank section is a section that is not occupied by a picture. For a process in which the sender client receives a collage sent by another client and adds a picture to a blank section of the collage to obtain the first collage, refer to the first implementation in operation 401. Details are no longer described herein in this embodiment of the present application.

Operation 402: The sender client generates a configuration file used for describing the first collage.

After acquiring the first collage, the sender client may generate the configuration file used for describing the first collage. The configuration file may include a type identifier of the target collage template and a position identifier of the at least one picture in the target collage template in the first collage. The type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold. The preset threshold may be set according to an actual requirement. This is not limited in this embodiment of the present application. For example, the preset threshold is 9. That is, a total quantity of sections in a template of the nonfixed-value template type does not exceed 9. In some embodiments, when the type of the target collage template is the fixed-value template type, the configuration file may further include a total quantity of sections. When the type of the target collage template is the nonfixed-value template type, the configuration file may further include a preset threshold.

Assuming that the type identifier may be ID-1 and ID-0, where ID-1 indicates that a type of a collage template is the fixed-value template type and ID-0 indicates that a type of a collage template is the nonfixed-value template type. In this case, ID-1a may indicate a fixed value template (a), and ID-0k may indicate a nonfixed value template k. A position identifier of a picture may be ID-11, indicating that a picture is in a first position in a collage template whose type identifier is ID-1.

For example, assuming that a type of the target collage template (e) is the fixed-value template type, the configuration file that is generated by the sender client and is used for describing the first collage may include information shown in following Table 1:

TABLE 1

| Type identifier | Position identifier | Total quantity of sections |
|---|---|---|
| ID-1e | ID-1e1->ID-A | 4 |

Referring to Table 1, a type identifier ID-1e indicates that the type of the target collage template (e) is the fixed-value template type, the position identifier ID-1e1->ID-A indicates that a picture whose identifier information is ID-A is in a first position in the target collage template (e), and a total quantity 4 of sections indicates that a total quantity of sections in the target collage template (e) is 4.

It should be noted that, this embodiment of the present application is described by using an example in which the type of the target collage template is the fixed-value template type. In actual application, the type of the target collage template may further be the nonfixed-value template type. Assuming that the target collage template is a nonfixed value template k, the configuration file that is generated by the sender client and is used for describing the first collage may include information shown in the following Table 2:

TABLE 2

| Type identifier | Position identifier | Preset threshold |
|---|---|---|
| ID-0k | ID-0k1->ID-A | 9 |

Referring to Table 2, a type identifier ID-0k indicates that a type of a target collage template (k) is the nonfixed-value template type, the position identifier ID-0k1->ID-A indicates that a picture whose identifier information is ID-A is in a first position in the target collage template (k), and the preset threshold 9 indicates that a total quantity of sections in the target collage template (k) is not greater than 9.

This embodiment of the present application is described by using an example in which the type of the target collage template is the fixed-value template type.

Operation 403: The sender client provides the configuration file to at least one receiver client in an image processing application.

After generating the configuration file used for describing the first collage, the sender client may provide the configuration file to the at least one receiver client. This embodiment of the present application is described by using an example in which the at least one receiver client includes the client in the image processing application on the second terminal 140 in the implementation environment shown in FIG. 1. In some embodiments, in this embodiment of the present application, the sender client may provide the configuration file to the at least one receiver client in one of the following three implementations:

In a first implementation, the sender client sends the configuration file to the at least one receiver client in a manner of an instant message.

The instant message may include, but is not limited to, a short messaging service (SMS) message and a short message in a chat application. This is not limited in this embodiment of the present application. For example, the sender client sends, in a manner of an SMS message, the configuration file to the client that is in the image processing application and is on the second terminal 140.

In a second implementation, the sender client sends the configuration file in a manner of a group message to the at least one receiver client that is in the image processing application and belongs to a same group.

In some embodiments, the image processing application may be associated with a chat group of a social networking application (e.g., WeChat). The sender client may be a member in the chat group. The sender client may send, by using the chat group, the configuration file in a manner of a group message to the at least one receiver client. For example, the sender client sends, in a manner of a group message, the configuration file to the client that is in the image processing application and is on the second terminal 140. For example, the group message relates to preparation of an electronic greeting card for a particular member of the chat group in connection with a special event (e.g., birthday, graduation, getting a new job, etc.) or another user of the social networking application who is not a member of the chat group (e.g., the chat group is created for this purpose but kept confidential from the other user. With different members of the chat group located at different parts of the world, this image processing application, in connection with the social networking application or as part of the social networking application, makes it possible for the members of the chat group to contribute to the creation of the electronic greeting card using their own pictures that they would like to add to the greeting card in a manner of their choice. After the sender client submits the first collage and the associated configuration file to the chat group of the social networking application, another member of the chat group can open the first collage on his/her terminal running the image processing application, update the first collage and the configuration file using their own pictures and the like, and then submit the updated first collage and the configuration file back to the chat group until the last member of the chat group completes the process or there is no room in the first collage for adding new pictures.

In some embodiments, it is the current sender client that determines who will be the next receiver client for receiving the first collage and the configuration file and updating them accordingly. For example, the social networking application may provide the current sender client a list of members of the chat group that have not added pictures to the first collage or refused to add pictures to the first collage. If the intended recipient of the first collage is also a member of the chat group, the first sender client may specify such member's identity so that the social networking application can avoid including the intended recipient of the first collage in the list of members to contribute to the first collage if the first sender client intends to keep the creation of the first collage confidential from the intended recipient. Alternatively, the social networking application may randomly select, among a list of members of the chat group that have not added pictures to the first collage or refused to add pictures to the first collage, a member as the next receiver client for editing the first collage.

In some embodiments, the first collage and the configuration file are sent to all the members of the chat group that have not contributed to the first collage in the form of a group message. Whoever opens the group message first will be the next receiver client for editing the first collage and the configuration file accordingly. In this case, the social networking application controls the process of updating the first collage and the configuration file such that only one member of the chat group is authorized to modify the first collage while the other members can only open the first collage in a read-only mode.

In some embodiments, the first sender client of the first collage determines how many pictures can be added to the first collage by choosing an image template that has a fixed-value template type or a nonfixed-value template type.

In some embodiments, the social networking application automatically sends the completed first collage as an electronic greeting card to its intended recipient as part of an instant message or an email message, e.g., when there is no blank section left in the first collage. This is the case when there are hundreds of members in the chat group and there is no need for every member to add a picture to the first collage. In this case, the first sender client may specify a maximum number of pictures to be added to the first collage by choosing a particular collage template and also provide the identity of the recipient in the configuration file or the description information of the first collage. While the intended recipient receives the first collage, the other members of the chat group each receive a copy of the completed first collage as well.

In some embodiments, the social networking application returns the completed first collage to the first sender client and let the first sender client send the completed first collage to the intended recipient. In this case, the first sender client may be able to customize the complete first collage before sending it out.

In some other embodiments, the process of creating a collage is performed by multiple users of the social networking application who are not necessarily within the same chat group. Instead, a first sender client sends a partially completed to a second sender client who is on the first sender client's contact list and the second sender client updates the collage and then sends the updated collage to a third sender client who is on the second sender client's contact list but may or may not be on the first sender client's contact list. The collage is passed from one client of the social networking application to next client of the social networking application until the collage is completed. In some embodiments, the social networking application keeps track of a list of clients that have contributed to the creation of the collage and automatically shares the completed collage with each client in the form of a group message among all the contributing clients of the social networking application.

In a third implementation, the sender client uploads the configuration file to a social-networking-information sharing platform corresponding to the image processing application, where information on the social-networking-information sharing platform corresponding to the image processing application is viewed by a receiver client that has a predetermined relationship with the sender client and has an access right.

Figures 4, 5:
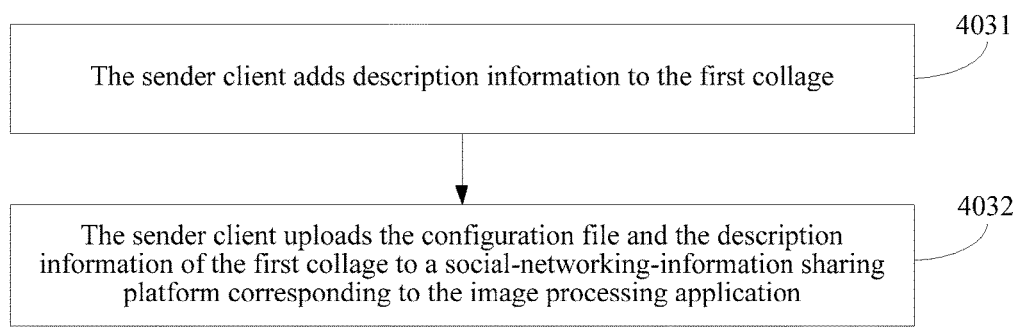

The predetermined relationship may include Friends, Follow, Subscription, and the like. This is not limited in this embodiment of the present application. For example, referring to FIG. 4-5, FIG. 4-5 is a method flowchart of the sender client uploading a configuration file to the social-networking-information sharing platform corresponding to the image processing application. Referring to FIG. 4-5, the method procedure may include:

Operation 4031: The sender client adds description information to the first collage.

The description information may include: a current opinion of the user of the sender client and information about collage content of the first collage. This is not limited in this embodiment of the present application.

Operation 4032: The sender client uploads the configuration file and the description information of the first collage to the social-networking-information sharing platform corresponding to the image processing application.

After adding the description information to the first collage, the sender client may upload the configuration file and the description information of the first collage to the social-networking-information sharing platform corresponding to the image processing application.

Operation 404: A receiver client acquires the configuration file that is provided by the sender client in the image processing application and is used for describing the first collage.

The receiver client may acquire the configuration file that is provided by the sender client and is used for describing the first collage. For example, in this embodiment of the present application, the receiver client may acquire, in the following three manners, the configuration file that is provided by the sender client and is used for describing the first collage:

In a first implementation, the receiver client receives the configuration file sent in a manner of an instant message by the sender client.

The instant message may include, but is not limited to, an SMS message and a short message in a chat application. This is not limited in this embodiment of the present application. For example, the receiver client receives the configuration file sent in a manner of an SMS message by the sender client.

In a second implementation, the receiver client receives the configuration file sent in a manner of a group message by the sender client, where the configuration file is sent, in a manner of a group message by the sender client, to the at least one receiver client that is in the image processing application and belongs to a same group.

The image processing application may set a chat group. The receiver client may be a member in the chat group. The receiver client may receive, by using the chat group, the configuration file sent in a manner of a group message by the sender client.

In a third implementation, the receiver client receives the configuration file uploaded by the sender client to the social-networking-information sharing platform corresponding to the image processing application, and information on the social-networking-information sharing platform corresponding to the image processing application is viewed by a receiver client that has a predetermined relationship with the sender client and has an access right.

The predetermined relationship may include: Friends, Follow, Subscription, and the like. This is not limited in this embodiment of the present application. It should be noted that, the receiver client may receive the description information added by the sender client to the first collage and the configuration file. This is not limited in this embodiment of the present application.

It should be noted that, operation 404 and the foregoing operation 403 are two opposite operations.

Operation 405: The receiver client acquires the first collage according to the configuration file.

After acquiring the configuration file used for describing the first collage, the receiver client may acquire the first collage according to the configuration file. For example, the receiver client loads the configuration file, and displays the first collage according to the configuration file. Specifically, the receiver client determines a type of the target collage template according to a type identifier in the configuration file, acquires the target collage template from a server according to the type of the target collage template, acquires, according to identifier information of a picture for forming the first collage, the picture for forming the first collage, and displays, in specified positions in the target collage template according to the position information, the picture for forming the first collage. For example, the receiver client acquires the target collage template (e) according to a type identifier ID-1e, acquires the picture A for forming the first collage according to ID-A, and then displays, according to the position identifier ID-1e1->ID-A, the picture A in a first position in the target collage template (e), so as to obtain the first collage shown in FIG. 4-4.

Operation 406: The receiver client detects whether a blank section exists in a target collage template for forming the first collage.

After acquiring the first collage, the receiver client detects whether a blank section exists in a target collage template for forming the first collage. The blank section is a section that is not occupied by a picture. For example, refer to FIG. 4-6, in this embodiment of the present application, the detecting, by the receiver client, whether a blank section exists in the target collage template for forming the first collage may include the following operations:

Operation 4061: The receiver client determines, according to a type identifier of the target collage template, a type of the target collage template for forming the first collage.

For example, the receiver client determines, according to a type identifier of the target collage template (e), the type of the target collage template for forming the first collage. Because the type that is of the target collage template (e) identifier and is in the configuration file is ID-1e, the receiver client determines that the type of the target collage template for forming the first collage is a fixed-value template type.

Operation 4062: The receiver client determines, according to the type of the target collage template for forming the first collage and a quantity of position identifiers in the first collage, whether a blank section exists in the target collage template for forming the first collage.

After determining the type of the target collage template for forming the first collage, the receiver client may determine, according to the type of the target collage template for forming the first collage and the quantity of position identifiers in the first collage, whether a blank section exists in the target collage template for forming the first collage. For example, referring to FIG. 4-7, in this embodiment of the present application, the determining, by the receiver client according to the type of the target collage template for forming the first collage and the quantity of position identifiers in the first collage, whether a blank section exists in the target collage template for forming the first collage may include:

Operation 40621: If the type of the target collage template is a fixed-value template type, the receiver client determines whether the quantity of position identifiers in the first collage is less than a fixed value, and if the quantity of position identifiers in the first collage is less than the fixed value, the receiver client determines that a blank section exists in the target collage template for forming the first collage.

For example, as may be seen from operation 4061, in this embodiment of the present application, the type of the target collage template is the fixed-value template type. The receiver client determines whether the quantity of position identifiers in the first collage is less than a fixed value. For example, the receiver client determines whether the quantity of position identifiers in the first collage is less than 4. If the quantity of position identifiers in the first collage is less than 4, the receiver client determines that a blank section exists in the target collage template for forming the first collage. Because the quantity of position identifiers in the first collage is 1, and 1 is less than 4, the receiver client determines that a blank section exists in the target collage template for forming the first collage.

Operation 40622: If the type of the target collage template is a nonfixed-value template type, the receiver client determines whether the quantity of position identifiers in the first collage is less than a preset threshold, and if the quantity of position identifiers in the first collage is less than the preset threshold, the receiver client determines that a blank section exists in the target collage template for forming the first collage.

For example, the receiver client determines whether the quantity of position identifiers in the first collage is less than 9. If the quantity of position identifiers in the first collage is less than 9, the receiver client determines that a blank section exists in the target collage template for forming the first collage. If the quantity of position identifiers in the first collage is not less than 9, a blank section does not exist in the target collage template for forming the first collage.

Operation 407: If a blank section exists in the target collage template for forming the first collage, the receiver client adds at least one picture to the blank section, to obtain a second collage.

If the receiver client determines that a blank section exists in the target collage template of the first collage in operation 406, the receiver client may add the at least one picture to the blank section, to obtain the second collage. Because the type of the target collage template may be the fixed-value template type, or may be the nonfixed-value template type, referring to FIG. 4-8, the adding, by the receiver client, the at least one picture to the blank section, to obtain the second collage may include:

Operation 4071: If the type of the target collage template is the fixed-value template type, the receiver client adds the at least one picture to the blank section, to obtain the second collage, where a quantity of the added at least one picture is less than or equal to a quantity of the blank sections.

For example, the receiver client may add the at least one picture to three blank sections shown in FIG. 4-4, to obtain the second collage. Preferably, when adding the at least one picture to the blank sections, the receiver client may add one picture to each blank section. As shown in FIG. 4-9, FIG. 4-9 shows that the receiver client may add one picture to the three blank sections shown in FIG. 4-4, to obtain the second collage. Referring to FIG. 4-9, the receiver client adds a picture B to a blank section (position identifier: ID-1e2), to obtain the second collage.

Operation 4072: If the type of the target collage template is the nonfixed-value template type, the receiver client adds a blank section to the target collage template, and adds the at least one picture to the blank section, to obtain the second collage, where a total quantity of sections in the target collage template after the blank section is added is less than or equal to a preset threshold.

If the type of the target collage template is the nonfixed-value template type, the first collage obtained after the at least one picture is added to the target collage template may be shown in FIG. 4-10. The receiver client may add a blank section to the target collage template shown in FIG. 4-10, to obtain the target collage template shown in FIG. 4-11, and subsequently, add the at least one picture to the blank section shown in FIG. 4-11, to obtain the second collage shown in FIG. 4-12. As shown in FIG. 4-11 and FIG. 4-12, this embodiment of the present application is described by using an example in which the receiver client adds one blank section B1 to the target collage template shown in FIG. 4-10 and adds a picture B to the one blank section B1.

Operation 408: The receiver client provides, to at least one remaining receiver client, a configuration file used for describing the second collage.

After obtaining the second collage, the receiver client may provide, to the at least one remaining receiver client, the configuration file used for describing the second collage. The remaining receiver client may include the sender client. This embodiment of the present application is described by using an example in which the remaining receiver client is the client that is in the image processing application and runs on the third terminal 160 in the implementation environment shown in FIG. 1. Specifically, the receiver client may first generate the configuration file used for describing the second collage, and then provide, to the at least one remaining receiver client, the configuration file used for describing the second collage. For a specific implementation manner of the process, refer to operation 402 and operation 403. Details are no longer described herein in this embodiment of the present application.

Operation 409: The receiver client sends, to the sender client, prompt information used for indicating that the first collage is changed.

After adding the at least one picture to the blank section in the target collage template for forming the first collage, the receiver client may send, to the sender client, prompt information used for indicating that the first collage is changed, to prompt the sender client to view the changed first collage, that is, prompt the sender client to view the second collage.

It should be noted that, after receiving the configuration file used for describing the second collage, the remaining receiver client may acquire the second collage according to the configuration file, and add the at least one picture to the blank section in the target collage template for forming the second collage, to obtain a third collage. As shown in FIG. 4-13, FIG. 4-13 is the third collage obtained after the remaining receiver client adds two pictures to two blank sections shown in FIG. 4-9. Referring to FIG. 4-13, the remaining receiver client adds a picture C to a blank section (position identifier: ID-1e3) and adds a picture D to a blank section (position identifier: ID-1e4), to obtain the third collage.

In conclusion, for the picture combining method provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

The following provides apparatus embodiments of the present application that are configured to perform the method embodiments of the present application. For details that are not disclosed in the apparatus embodiments of the present application, refer to the method embodiments of the present application.

FIG. 5 is a schematic structural diagram of a terminal provided in an embodiment of the present application. A receiver client in an image processing application may run on the terminal. The terminal may be the second terminal 140 in the implementation environment shown in FIG. 1. Referring to FIG. 5, the terminal may include:

a first acquisition module 510, configured to acquire a configuration file that is provided by a sender client in the image processing application and is used for describing a first collage, where the first collage is a collage obtained after the sender client adds at least one picture to a target collage template of the image processing application, and the configuration file is a configuration file that is generated by the sender client after the sender client obtains the first collage and is provided to at least one receiver client;

a second acquisition module 520, configured to acquire the first collage according to the configuration file;

a detection module 530, configured to detect whether a blank section exists in the target collage template for forming the first collage, where the blank section is a section that is not occupied by a picture; and an addition module 540, configured to: when a blank section exists in the target collage template for forming the first collage, add at least one picture to the blank section, to obtain a second collage.

In conclusion, for the terminal provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

Figures 4, 5, 6:
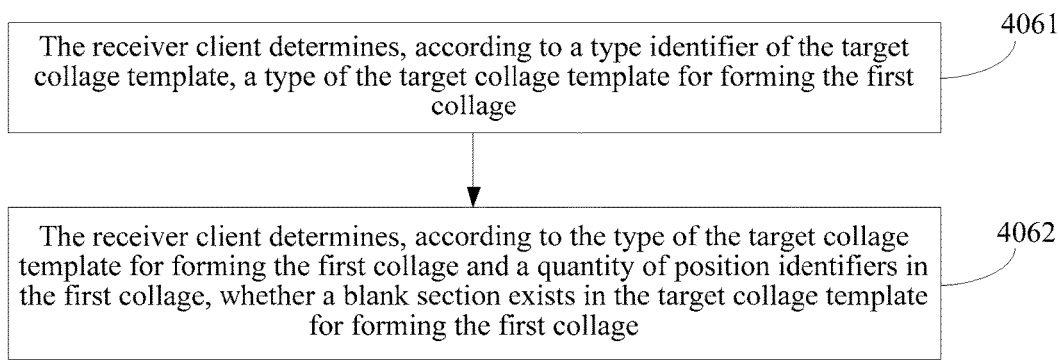

FIG. 6-1 is a schematic structural diagram of a terminal provided in another embodiment of the present application. A receiver client in an image processing application may run on the terminal. The terminal may be the second terminal 140 in the implementation environment shown in FIG. 1. Referring to FIG. 6-1, the terminal may include, but is not limited to:

a first acquisition module 610, configured to acquire a configuration file that is provided by a sender client in the image processing application and is used for describing a first collage, where the first collage is a collage obtained after the sender client adds at least one picture to a target collage template of the image processing application, and the configuration file is a configuration file that is generated by the sender client after the sender client obtains the first collage and is provided to at least one receiver client;

a second acquisition module 620, configured to acquire the first collage according to the configuration file;

a detection module 630, configured to detect whether a blank section exists in the target collage template for forming the first collage, where the blank section is a section that is not occupied by a picture; and an addition module 640, configured to: when a blank section exists in the target collage template for forming the first collage, add at least one picture to the blank section, to obtain a second collage.

In some embodiments, referring to FIG. 6-2, FIG. 6-2 is a block diagram of the first acquisition module 610. Referring to FIG. 6-2, the first acquisition module 610 may include:

a first receiving unit 611, configured to receive the configuration file sent in a manner of an instant message by the sender client; or, a second receiving unit 612, configured to receive the configuration file sent in a manner of a group message by the sender client, where the configuration file is sent, in a manner of a group message by the sender client, to the at least one receiver client that is in the image processing application and belongs to a same group; or, a third receiving unit 613, configured to receive the configuration file that is uploaded by the sender client to a social-networking-information sharing platform corresponding to the image processing application, where information on the social-networking-information sharing platform corresponding to the image processing application is viewed by a receiver client that has a predetermined relationship with the sender client and has an access right.

In some embodiments, the configuration file includes a type identifier of the target collage template and a position identifier of the at least one picture in the target collage template in the first collage. The type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold.

Referring to FIG. 6-3, FIG. 6-3 is a block diagram of the detection module 630. Referring to FIG. 6-3, the detection module 630 includes:

a determining unit 631, configured to determine, according to the type identifier of the target collage template, the type of the target collage template for forming the first collage; and a judging unit 632, configured to determine, according to the type of the target collage template for forming the first collage and a quantity of position identifiers in the first collage, whether a blank section exists in the target collage template for forming the first collage.

In some embodiments, the judging unit 632 is configured to: when the type of the target collage template is the fixed-value template type, determine whether the quantity of position identifiers in the first collage is less than a fixed value, and when the quantity of position identifiers in the first collage is less than the fixed value, determine that a blank section exists in the target collage template for forming the first collage; and when the type of the target collage template is the nonfixed-value template type, determine whether the quantity of position identifiers in the first collage is less than a preset threshold, and when the quantity of position identifiers in the first collage is less than the preset threshold, determine that a blank section exists in the target collage template for forming the first collage.

In some embodiments, the addition module 640 is configured to: when the type of the target collage template is the fixed-value template type, add the at least one picture to the blank section, to obtain the second collage, where a quantity of the added at least one picture is less than or equal to a quantity of the blank sections; and when the type of the target collage template is the nonfixed-value template type, add a blank section to the target collage template, and add the at least one picture to the blank section, to obtain the second collage, where a total quantity of sections in the target collage template after the blank section is added is less than or equal to a preset threshold.

In some embodiments, continuing to refer to FIG. 6-1, the terminal further includes:

a providing module 650, configured to provide, to at least one remaining receiver client, a configuration file used for describing the second collage, where the remaining receiver client includes the sender client; and a sending module 660, configured to send, to the sender client, prompt information used for indicating that the first collage is changed.

In conclusion, for the terminal provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

Figures 4, 5, 6, 7:
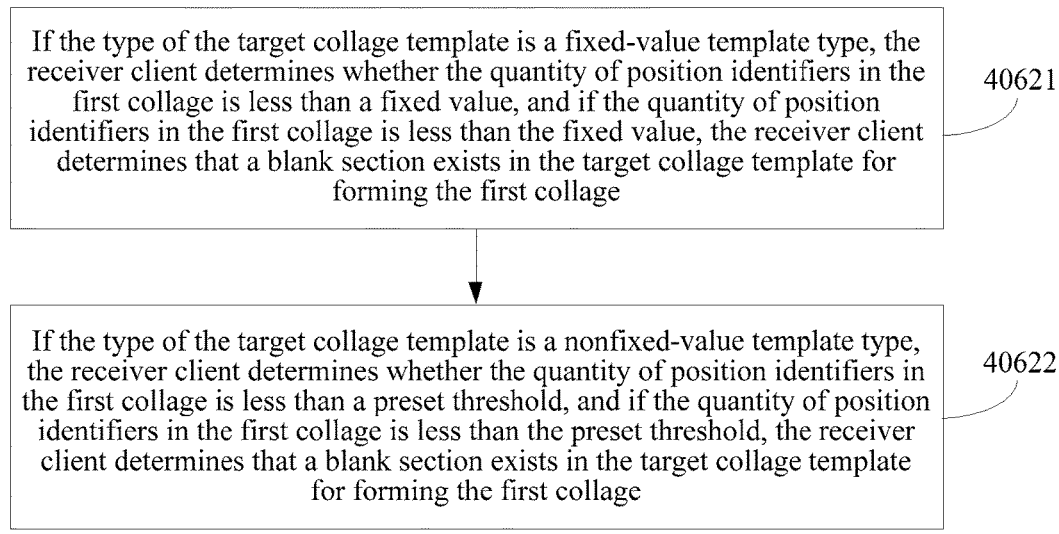

FIG. 7-1 is a schematic structural diagram of a terminal provided in still another embodiment of the present application. A sender client in an image processing application may run on the terminal. The terminal may be the first terminal 120 in the implementation environment shown in FIG. 1. Referring to FIG. 7-1, the terminal may include:

an acquisition module 710, configured to acquire a first collage, where the first collage is a collage obtained after the sender client adds at least one picture to a target collage template of the image processing application;

a generation module 720, configured to generate a configuration file used for describing the first collage; and a providing module 730, configured to provide the configuration file to at least one receiver client in the image processing application, so that the at least one receiver client acquires the configuration file, acquires the first collage according to the configuration file, and when a blank section exists in the target collage template for forming the first collage, adds at least one picture to the blank section, to obtain a second collage, where the blank section is a section that is not occupied by a picture.

In conclusion, for the terminal provided in this embodiment of the present application, a sender client acquires a first collage, generates a configuration file used for describing the first collage, and provides the configuration file to at least one receiver client in an image processing application, so that the at least one receiver client acquires the configuration file, acquires the first collage according to the configuration file, and when a blank section exists in a target collage template for forming the first collage, adds at least one picture to the blank section, to obtain a second collage. When determining that a blank section exists in the target collage template for forming the first collage, a receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

In some embodiments, referring to FIG. 7-2, FIG. 7-2 is a block diagram of the providing module 730. Referring to FIG. 7-2, the providing module 730 includes:

a first sending unit 731, configured to send the configuration file to the at least one receiver client in a manner of an instant message; or, a second sending unit 732, configured to send the configuration file in a manner of a group message to the at least one receiver client that is in the image processing application and belongs to a same group; or, a third sending unit 733, configured to upload the configuration file to a social-networking-information sharing platform corresponding to the image processing application, where information on the social-networking-information sharing platform corresponding to the image processing application is viewed by a receiver client that has a predetermined relationship with the sender client and has an access right.

In some embodiments, the third sending unit 733 is configured to: add description information to the first collage; and upload the configuration file and the description information of the first collage to the social-networking-information sharing platform corresponding to the image processing application.

In some embodiments, the acquisition module 710 is configured to perform pre-processing on at least one picture in the image processing application, where the pre-processing includes at least one of beauty retouching, filter applying, and sharpening; and add the pre-processed at least one picture to the target collage template, to obtain the first collage.

In some embodiments, the configuration file includes a type identifier of the target collage template and a position identifier of the at least one picture in the target collage template in the first collage. The type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold.

In conclusion, for the terminal provided in this embodiment of the present application, a sender client acquires a first collage, generates the configuration file used for describing the first collage, and provides a configuration file to at least one receiver client in an image processing application, so that the at least one receiver client acquires the configuration file, acquires the first collage according to the configuration file, and when a blank section exists in a target collage template for forming the first collage, adds at least one picture to the blank section, to obtain a second collage. When determining that a blank section exists in the target collage template for forming the first collage, a receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

It should be noted that when the terminal provided in the foregoing embodiments performs picture combining, the foregoing division of functional modules is only used as an example for description. In practical applications, the foregoing functions may be allocated to be accomplished by different functional modules according to needs, that is, the internal structure of the device is divided into different functional modules to accomplish all or some of the functions described above. In addition, the terminal provided in the foregoing embodiments shares the same concept with the embodiments of the picture combining method, and refer to the method embodiments for the specific implementation process of the terminal, which is no longer elaborated herein.

Figures 4, 5, 6, 7, 8, 9, 10:
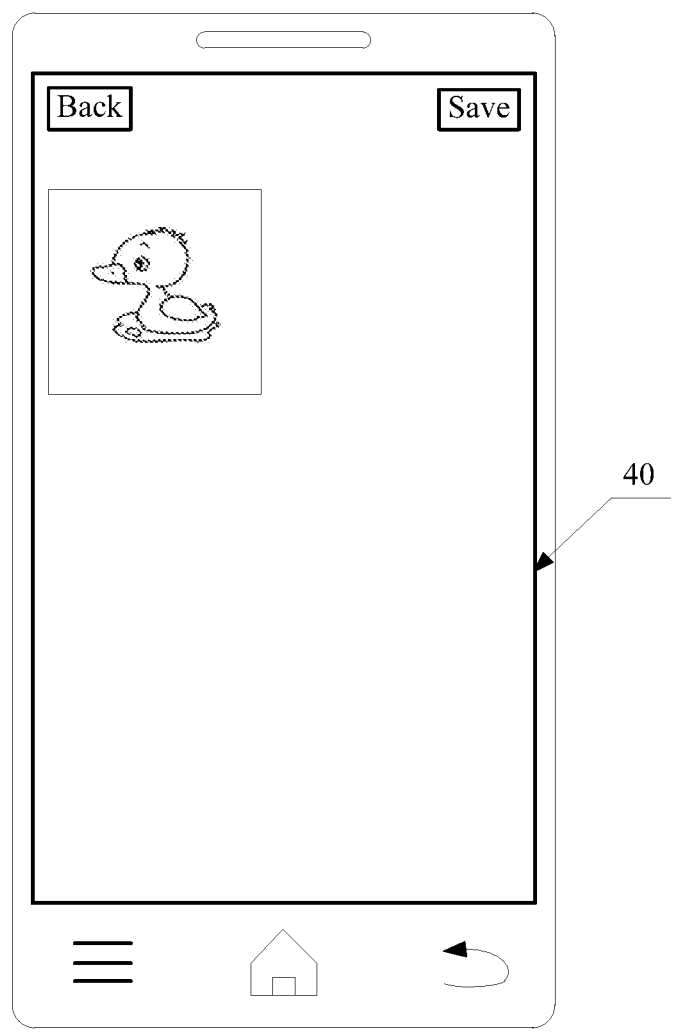
Figures 4, 5, 6, 7, 8, 9, 10, 11:
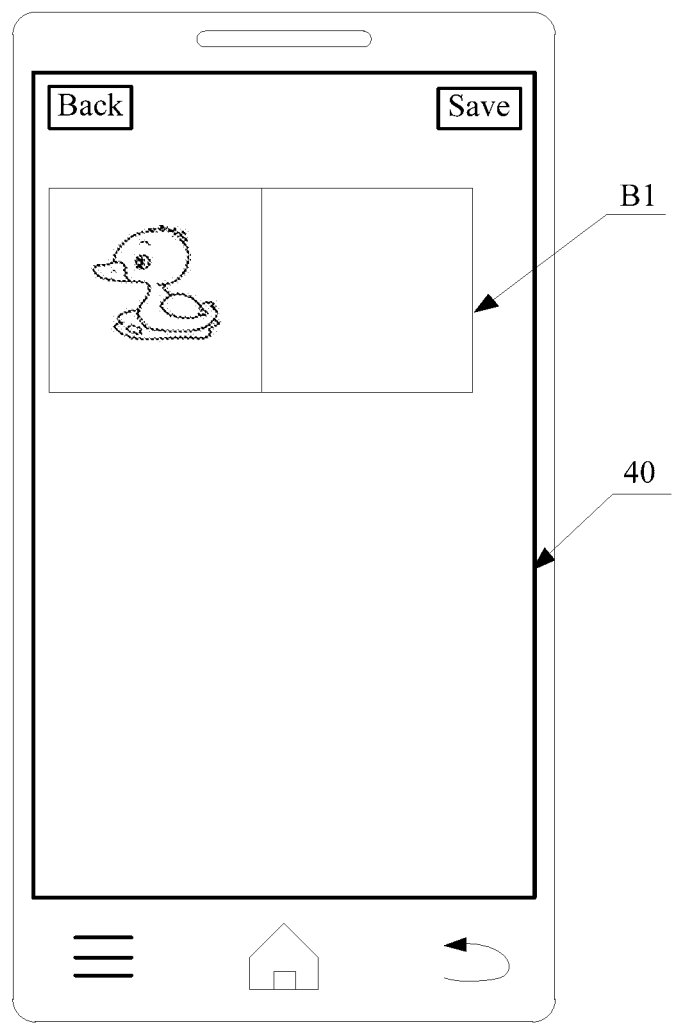
Figures 4, 5, 6, 7, 8, 9, 10, 11, 12:
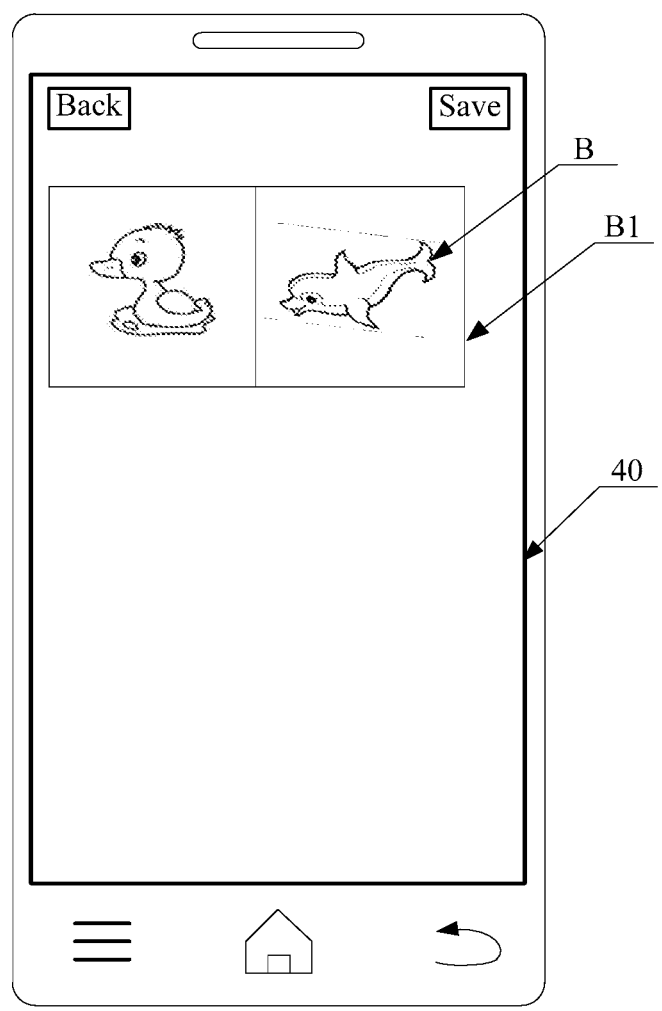
Figures 4, 5, 6, 7, 8, 9, 10, 11, 12, 13:
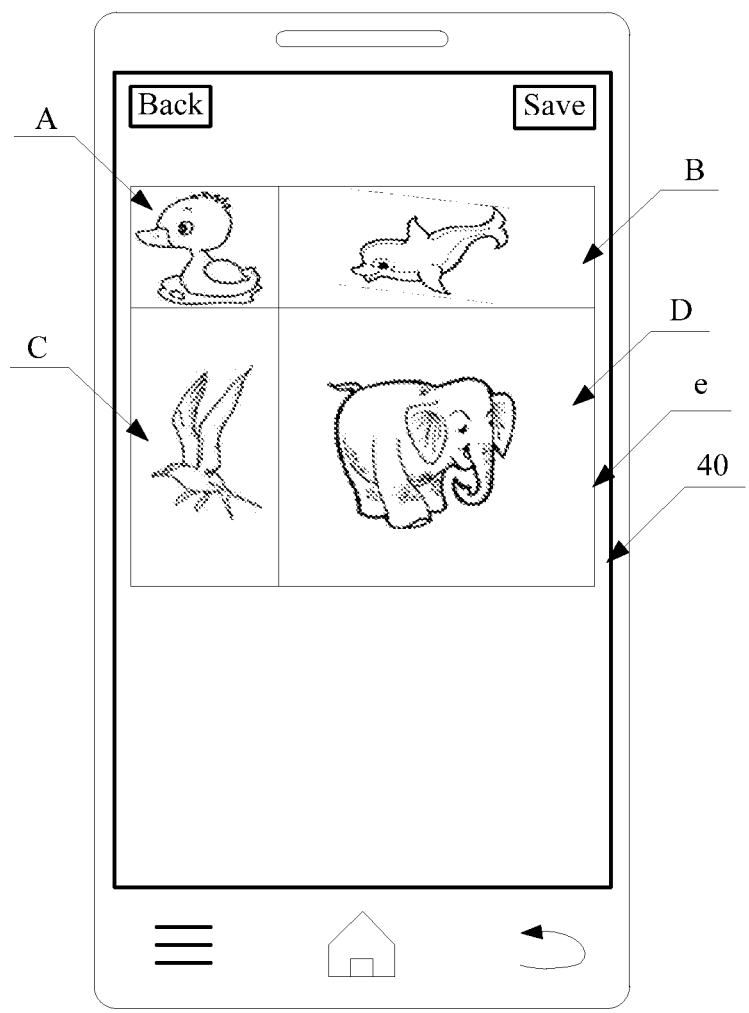
Figure 5:
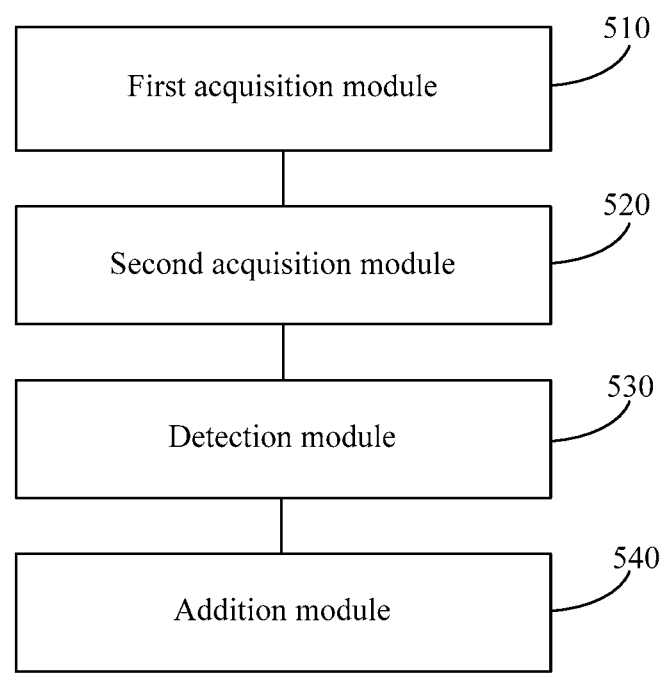
Figures 1, 6:
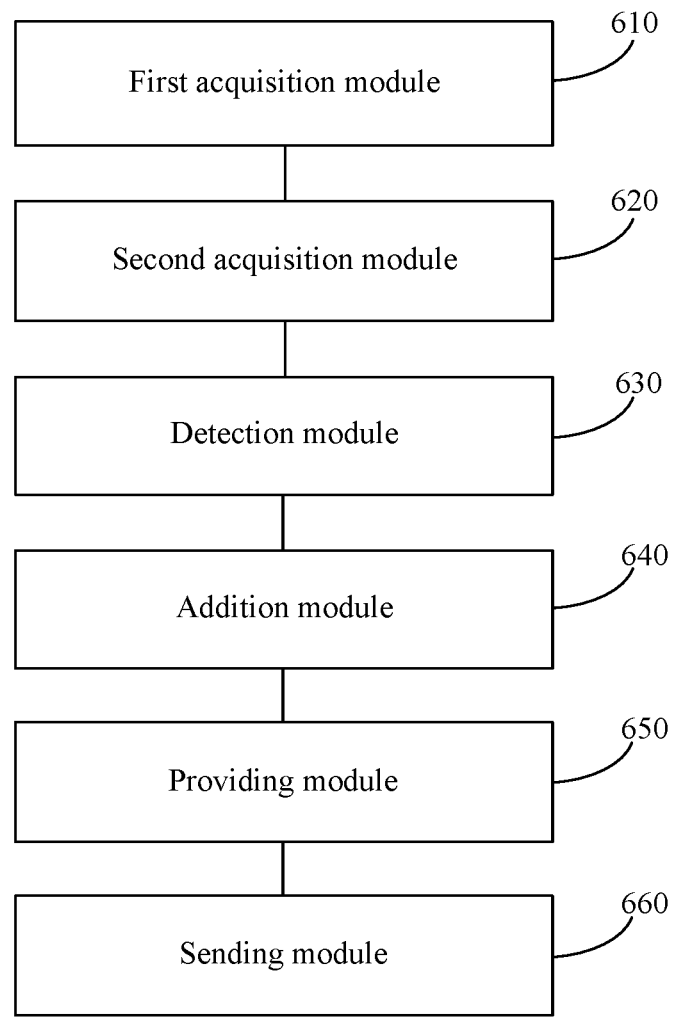
Figures 2, 6:
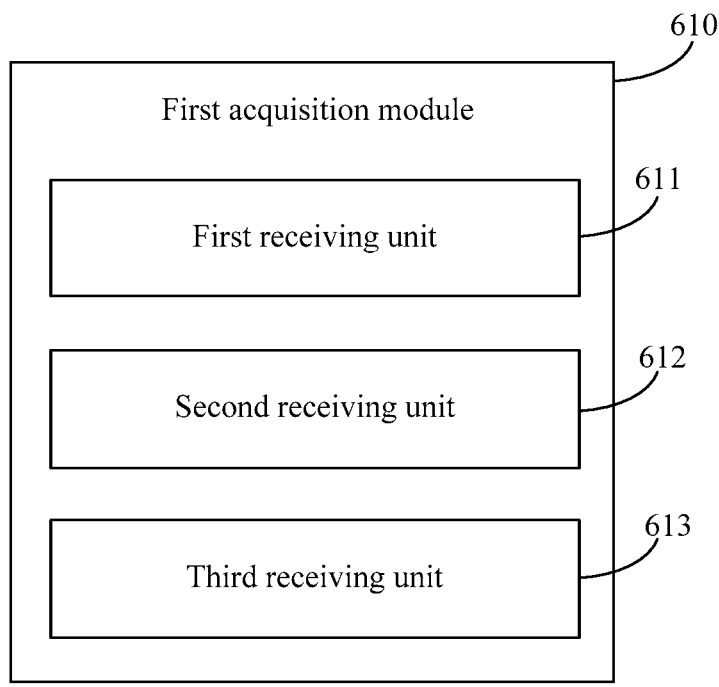
Figures 3, 6:
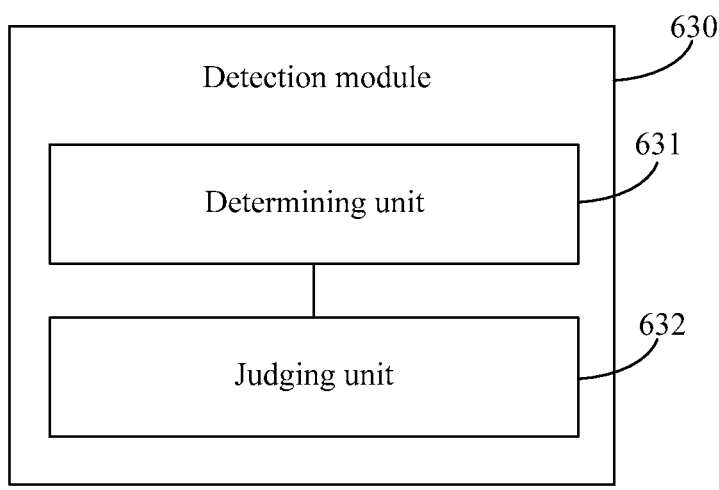
Figures 1, 7:
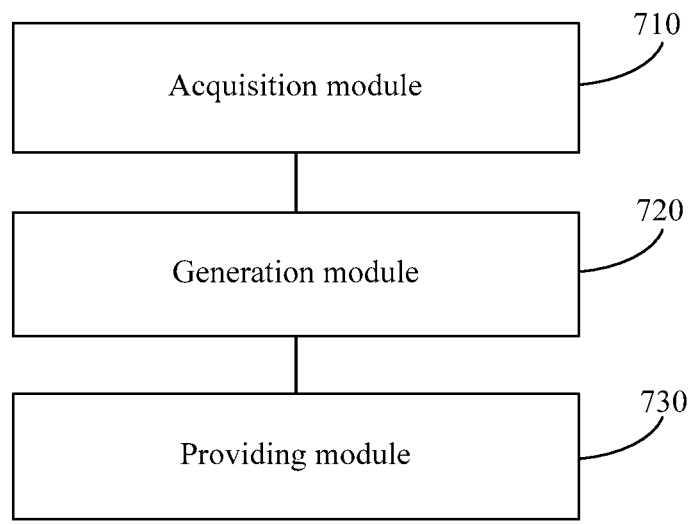
Figures 2, 7:
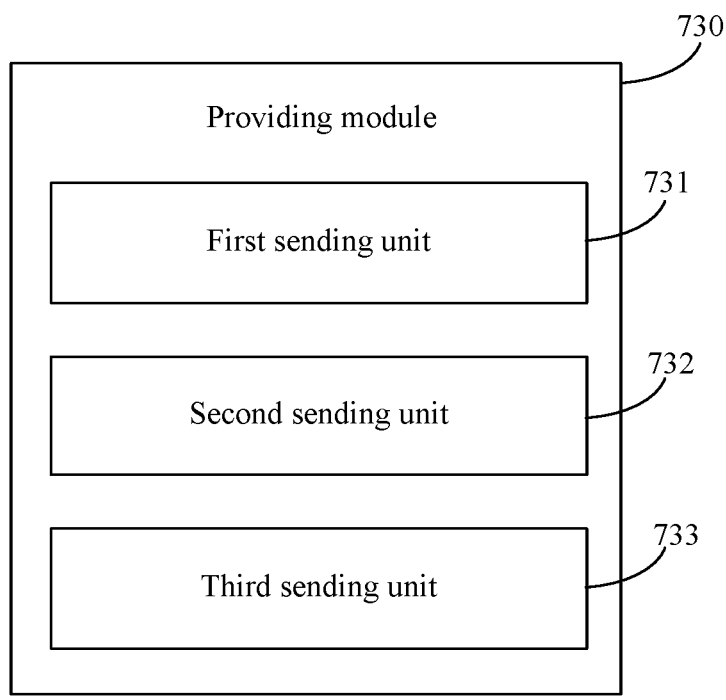
Figure 8:
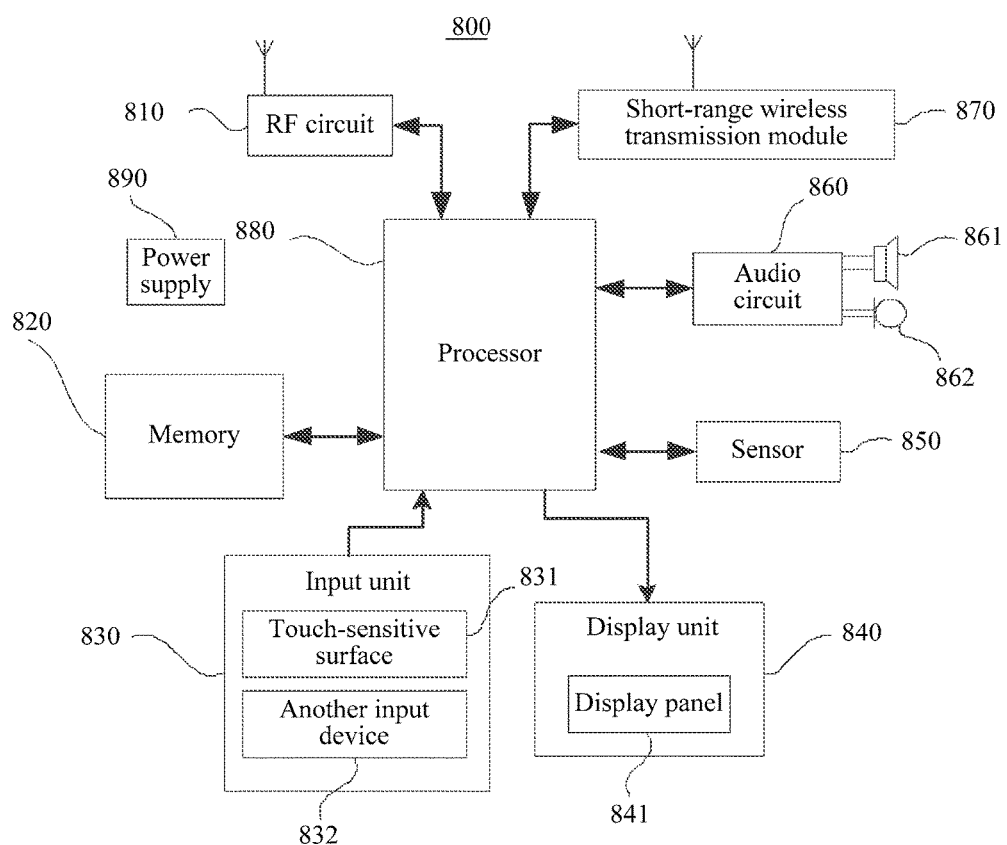
Figure 9:
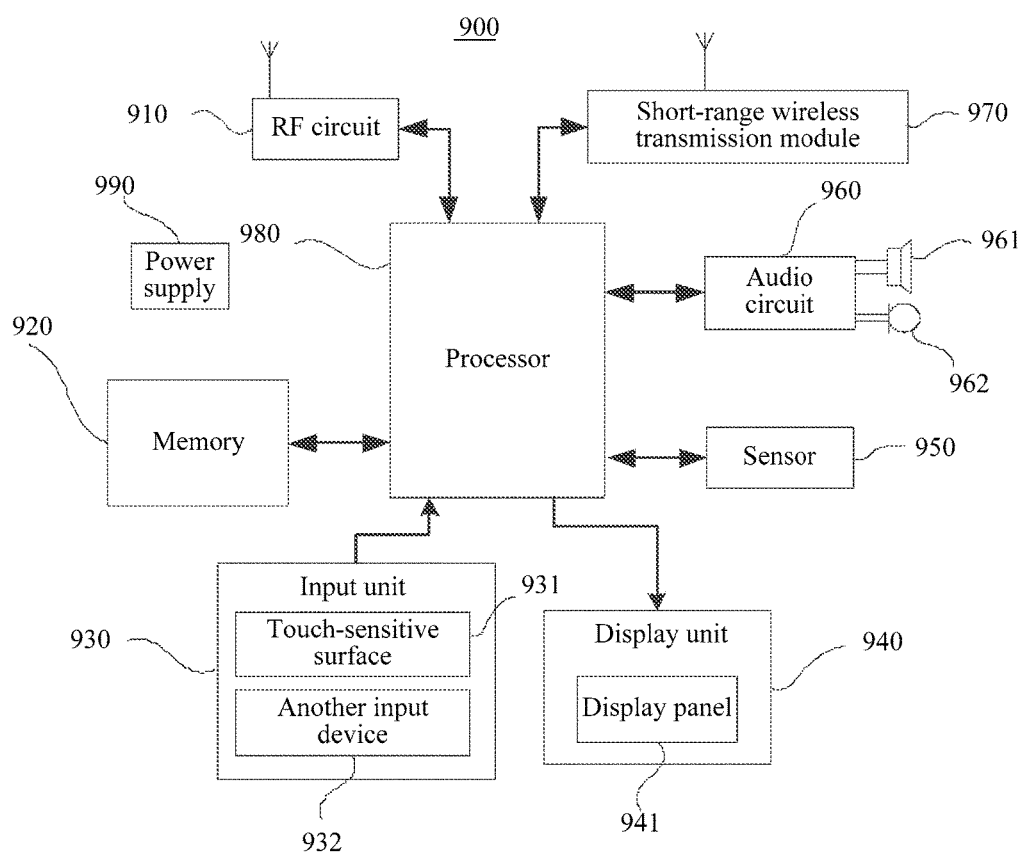
Figure 10:
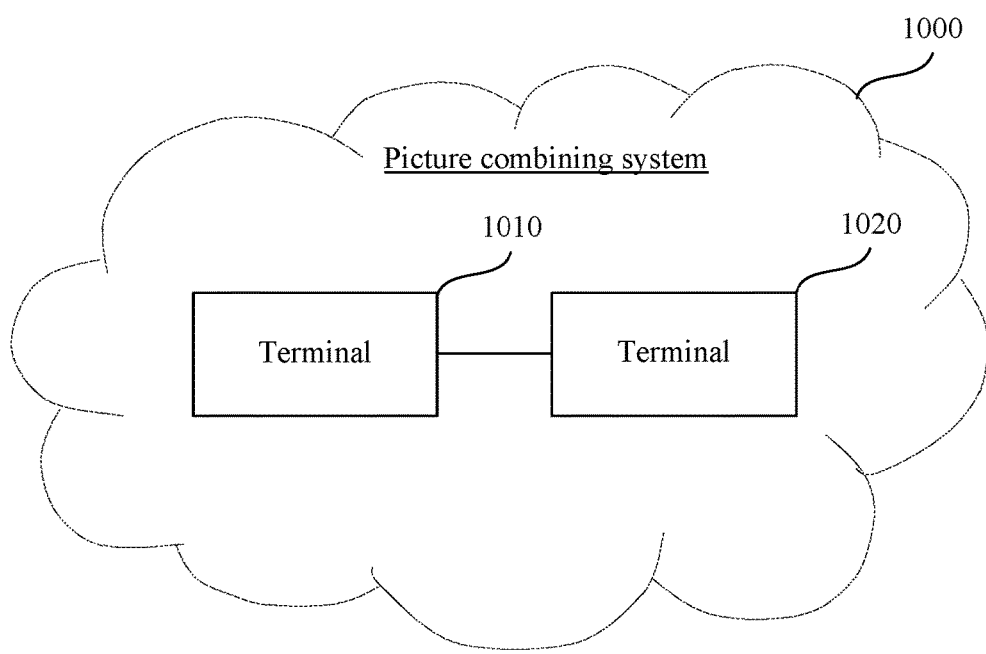

FIG. 8 is a schematic structural diagram of a terminal 800 provided in an embodiment of the present application. A receiver client in an image processing application runs on the terminal 800. Specifically:

The terminal 800 may include components such as a radio frequency (RF) circuit 810, a memory 820 including one or more computer readable storage media, an input unit 830, a display unit 840, a sensor 850, an audio circuit 860, a short-range wireless transmission module 870, one or more processors 880, and a power supply 890. A person skilled in the art may understand that the structure of the terminal shown in FIG. 8 does not constitute a limitation on the terminal, and the terminal may include more components or fewer components than those shown in the figure, or some components may be combined, or a different component deployment may be used.

The RF circuit 810 may be configured to receive and send signals during an information receiving and sending process or a call process. Particularly, the RF circuit 810 receives downlink information from a base station, then delivers the downlink information to the one or more processors 880 for processing, and in addition, sends related uplink data to the base station. Generally, the RF circuit 810 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 810 may further communicate with a network and another device by means of wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, SMS, and the like. The memory 820 may be configured to store a software program and module. For example, the memory 820 may be configured to store a preset time list, may further be configured to store a software program for collecting a speech signal, a software program for implementing keyword recognition, a software program for implementing continuous speech recognition, and a software program for implementing appointment setting and reminder, and may further be configured to store a binding relationship between a wireless access point and a user account. The processor 880 runs the software program and module stored in the memory 820, to implement various functional applications and data processing. The memory 820 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 820 may include a high speed random access memory (RAM), and may further include a non-volatile memory, such as at least one magnetic disk storage device, a flash memory device, or another volatile solid-state storage device. Correspondingly, the memory 820 may further include a memory controller, so as to provide access of the processor 880 and the input unit 830 to the memory 820.

The input unit 830 may be configured to receive input digit or character information, and generate a keyboard, mouse, joystick, optical, or track ball signal input related to the user setting and function control. Specifically, the input unit 830 may include a touch-sensitive surface 831 and another input device 832. The touch-sensitive surface 831, which may also be referred to as a touch screen or a touch panel, may collect a touch operation of a user on or near the touch-sensitive surface (such as an operation of a user on or near the touch-sensitive surface 831 by using any suitable object or accessory, such as a finger or a stylus), and drive a corresponding connection apparatus according to a preset program. In some embodiments, the touch-sensitive surface 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. Moreover, the touch controller can receive and execute a command sent from the processor 880. In addition, the touch-sensitive surface 831 may be may be a resistive, capacitive, infrared, or surface sound wave type touch-sensitive surface. In addition to the touch-sensitive surface 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various graphical user interfaces of the terminal 800. The graphical user interfaces may be formed by a graph, a text, an icon, a video, or any combination thereof. The display unit 840 may include a display panel 841. In some embodiments, the display panel 841 may be configured by using a liquid crystal display (LCD), an organic light-emitting diode (OLED), or the like. Further, the touch-sensitive surface 831 may cover the display panel 841. After detecting a touch operation on or near the touch-sensitive surface 831, the touch-sensitive surface 831 transfers the touch operation to the processor 880, so as to determine the type of the touch event. Then, the processor 880 provides a corresponding visual output on the display panel 841 according to the type of the touch event. Although, in FIG. 4, the touch-sensitive surface 831 and the display panel 841 are used as two separate parts to implement input and output functions, in some embodiments, the touch-sensitive surface 831 and the display panel 841 may be integrated to implement the input and output functions.

The terminal 800 may further include at least one sensor 850, such as an optical sensor, a motion sensor, and other sensors. Specifically, the optical sensor may include an ambient light sensor and a proximity sensor. The ambient light sensor can adjust luminance of the display panel 841 according to brightness of the ambient light. The proximity sensor may switch off the display panel 841 and/or backlight when the terminal 800 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 800, are not further described herein.

The audio circuit 860, a loudspeaker 861, and a microphone 862 may provide audio interfaces between the user and the terminal 800. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another terminal by using the RF circuit 810, or outputs the audio data to the memory 820 for further processing. The audio circuit 860 may further include an earplug jack, so as to provide communication between a peripheral earphone and the terminal 800.

The short-range wireless transmission module 870 may be a WiFi module, a Bluetooth module, or the like. The terminal 800 may help, by using the short-range wireless transmission module 870, the user to receive and send e-mails, browse a webpage, access streaming media, and so on, which provides wireless broadband Internet access for the user. Although FIG. 8 shows the short-range wireless transmission module 870, it may be understood that the wireless communications unit is not a necessary component of the terminal 800, and when required, the wireless communications unit may be omitted as long as the scope of the essence of the present disclosure is not changed.

The processor 880 is the control center of the terminal 800, and is connected to various parts of the terminal by using various interfaces and lines. By running or executing the software program and/or module stored in the memory 820, and invoking data stored in the memory 820, the processor 880 performs various functions and data processing of the terminal 800, thereby performing overall monitoring on the mobile phone. In some embodiments, the processor 880 may include one or more processing cores. In some embodiments, the processor 880 may integrate an application processor and a modem. The application processor mainly processes an operating system, a user interface, an application program, and the like. The modem mainly processes wireless communication. It may be understood that the foregoing modem may also not be integrated into the processor 880.

The terminal 800 further includes the power supply 890 (such as a battery) for supplying power to the components. Preferably, the power supply may be logically connected to the processor 880 by using a power management system, thereby implementing functions such as charging, discharging and power consumption management by using the power management system. The power supply 890 may further include one or more of a direct current or alternating current power supply, a re-charging system, a power failure detection circuit, a power supply converter or inverter, a power supply state indicator, and any other components.

Although not shown in the figure, the terminal 800 may further include a camera, a Bluetooth module, and the like, which are not further described herein.

The terminal 800 further includes a memory and one or more programs. The one or more programs are stored in the memory and configured to be executed by one or more processors to perform the picture combining method according to the foregoing method embodiments.

In conclusion, for the terminal provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

FIG. 9 is a schematic structural diagram of a terminal 900 provided in an embodiment of the present application. A sender client in an image processing application runs on the terminal 900. Specifically:

The terminal 900 may include components such as an RF circuit 910, a memory 920 including one or more computer readable storage media, an input unit 930, a display unit 940, a sensor 950, an audio circuit 960, a short-range wireless transmission module 970, one or more processors 980, and a power supply 990. A person skilled in the art may understand that the structure of the terminal shown in FIG. 9 does not constitute a limitation on the terminal, and the terminal may include more components or fewer components than those shown in the figure, or some components may be combined, or a different component deployment may be used.

The RF circuit 910 may be configured to receive and send signals during an information receiving and sending process or a call process. Particularly, the RF circuit 910 receives downlink information from a base station, then delivers the downlink information to the one or more processors 980 for processing, and in addition, sends related uplink data to the base station. Generally, the RF circuit 910 includes, but is not limited to, an antenna, at least one amplifier, a tuner, one or more oscillators, a SIM card, a transceiver, a coupler, an LNA, and a duplexer. In addition, the RF circuit 910 may further communicate with a network and another device by means of wireless communication. The wireless communication may use any communications standard or protocol, which includes, but is not limited to, GSM, GPRS, CDMA, WCDMA, LTE, e-mail, SMS, and the like. The non-transitory memory 920 may be configured to store a software program and module. For example, the memory 920 may be configured to store a preset time list, may further be configured to store a software program for collecting a speech signal, a software program for implementing keyword recognition, a software program for implementing continuous speech recognition, and a software program for implementing appointment setting and reminder, and may further be configured to store a binding relationship between a wireless access point and a user account. The processor 980 runs the software program and module stored in the memory 920, to implement various functional applications and data processing. The memory 920 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 920 may include a high speed RAM, and may further include a non-volatile memory, such as at least one magnetic disk storage device, a flash memory device, or another volatile solid-state storage device. Correspondingly, the memory 920 may further include a memory controller, so as to provide access of the processor 980 and the input unit 930 to the memory 920.

The input unit 930 may be configured to receive input digit or character information, and generate a keyboard, mouse, joystick, optical, or track ball signal input related to the user setting and function control. Specifically, the input unit 930 may include a touch-sensitive surface 931 and another input device 932. The touch-sensitive surface 931, which may also be referred to as a touch screen or a touch panel, may collect a touch operation of a user on or near the touch-sensitive surface (such as an operation of a user on or near the touch-sensitive surface 931 by using any suitable object or accessory, such as a finger or a stylus), and drive a corresponding connection apparatus according to a preset program. In some embodiments, the touch-sensitive surface 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 980. Moreover, the touch controller can receive and execute a command sent from the processor 980. In addition, the touch-sensitive surface 931 may be may be a resistive, capacitive, infrared, or surface sound wave type touch-sensitive surface. In addition to the touch-sensitive surface 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information input by the user or information provided for the user, and various graphical user interfaces of the terminal 900. The graphical user interfaces may be formed by a graph, a text, an icon, a video, or any combination thereof. The display unit 940 may include a display panel 941. In some embodiments, the display panel 941 may be configured by using an LCD, an OLED, or the like. Further, the touch-sensitive surface 931 may cover the display panel 941. After detecting a touch operation on or near the touch-sensitive surface 931, the touch-sensitive surface 931 transfers the touch operation to the processor 980, so as to determine the type of the touch event. Then, the processor 980 provides a corresponding visual output on the display panel 941 according to the type of the touch event. Although, in FIG. 4, the touch-sensitive surface 931 and the display panel 941 are used as two separate parts to implement input and output functions, in some embodiments, the touch-sensitive surface 931 and the display panel 941 may be integrated to implement the input and output functions.

The terminal 900 may further include at least one sensor 950, such as an optical sensor, a motion sensor, and other sensors. Specifically, the optical sensor may include an ambient light sensor and a proximity sensor. The ambient light sensor can adjust luminance of the display panel 941 according to brightness of the ambient light. The proximity sensor may switch off the display panel 941 and/or backlight when the terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 960, a loudspeaker 961, and a microphone 962 may provide audio interfaces between the user and the terminal 900. The audio circuit 960 may convert received audio data into an electric signal and transmit the electric signal to the loudspeaker 961. The loudspeaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another terminal by using the RF circuit 910, or outputs the audio data to the memory 920 for further processing. The audio circuit 960 may further include an earplug jack, so as to provide communication between a peripheral earphone and the terminal 900.

The short-range wireless transmission module 970 may be a WiFi module, a Bluetooth module, or the like. The terminal 900 may help, by using the short-range wireless transmission module 970, the user to receive and send e-mails, browse a webpage, access streaming media, and so on, which provides wireless broadband Internet access for the user. Although FIG. 9 shows the short-range wireless transmission module 970, it may be understood that the wireless communications unit is not a necessary component of the terminal 900, and when required, the wireless communications unit may be omitted as long as the scope of the essence of the present disclosure is not changed.

The processor 980 is the control center of the terminal 900, and is connected to various parts of the terminal by using various interfaces and lines. By running or executing the software program and/or module stored in the memory 920, and invoking data stored in the memory 920, the processor 980 performs various functions and data processing of the terminal 900, thereby performing overall monitoring on the mobile phone. In some embodiments, the processor 980 may include one or more processing cores. In some embodiments, the processor 980 may integrate an application processor and a modem. The application processor mainly processes an operating system, a user interface, an application program, and the like. The modem mainly processes wireless communication. It may be understood that the foregoing modem may also not be integrated into the processor 980.

The terminal 900 further includes the power supply 990 (such as a battery) for supplying power to the components. Preferably, the power supply may be logically connected to the processor 980 by using a power management system, thereby implementing functions such as charging, discharging and power consumption management by using the power management system. The power supply 990 may further include one or more of a direct current or alternating current power supply, a re-charging system, a power failure detection circuit, a power supply converter or inverter, a power supply state indicator, and any other components.

Although not shown in the figure, the terminal 900 may further include a camera, a Bluetooth module, and the like, which are not further described herein.

The terminal 900 further includes a memory and one or more programs. The one or more programs are stored in the memory and configured to be executed by one or more processors to perform the picture combining method according to the foregoing method embodiments.

In conclusion, for the terminal provided in this embodiment of the present application, a sender client acquires a first collage, generates a configuration file used for describing the first collage, and provides the configuration file to at least one receiver client in an image processing application, so that the at least one receiver client acquires the configuration file, acquires the first collage according to the configuration file, and when a blank section exists in a target collage template for forming the first collage, adds at least one picture to the blank section, to obtain a second collage. When determining that a blank section exists in the target collage template for forming the first collage, a receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

FIG. 10 is a schematic structural diagram of a picture combining system 1000 provided in an embodiment of the present application. Referring to FIG. 10, the picture combining system 1000 may include a terminal 1010 and a terminal 1020.

In a possible implementation manner, the terminal 1010 may be the terminal shown in FIG. 5 or FIG. 6-1, and the terminal 1020 may be the terminal shown in FIG. 7-1.

In another possible implementation manner, the terminal 1010 may be the terminal shown in FIG. 8, and the terminal 1020 may be the terminal shown in FIG. 9.

In conclusion, for the picture combining system provided in this embodiment of the present application, a receiver client acquires a configuration file that is provided by a sender client in an image processing application and is used for describing a first collage, acquires the first collage according to the configuration file, detects whether a blank section exists in a target collage template for forming the first collage, and if a blank section exists in the target collage template for forming the first collage, adds at least one picture to the blank section, to obtain a second collage. Because the first collage is a collage obtained after the sender client adds at least one picture to the target collage template of the image processing application, when determining that a blank section exists in the target collage template for forming the first collage, the receiver client adds the at least one picture to the blank section, to obtain the second collage. Therefore, different clients in the image processing application may complete picture combining, so as to resolve problems in related technologies that the flexibility of picture combining is relatively low and an effect of a collage formed through picture combining is monotonous, thereby achieving beneficial effects of improving the flexibility of picture combining and enhancing the variety of collages.

In an exemplary embodiment, an embodiment of the present application further provides a non-transitory computer readable storage medium including an instruction, for example, a memory including an instruction. The foregoing instruction may be executed by a processor of a terminal to accomplish the foregoing picture combining method. For example, the non-transitory computer readable storage medium may be a ROM, a RAM, a CD-ROM, a magnetic disk, a floppy disk, an optical data storage device, or the like.

The sequence numbers of the above embodiments of the present application are merely for the convenience of description, and do not imply the preference among the embodiments.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. A method for creating a collage among members of a chat group of a social networking application, performed at a terminal having one or more processors, a display, and memory storing a plurality of programs including an image processing application associated with the social networking application, and the method comprising:
   detecting a request from a user of the terminal for creating a collage, wherein the user is a member of the chat group of the social networking application;
   in response to the user request, rendering a graphical user interface on the display of the terminal, the graphical user interface including a plurality of candidate collage templates;
   detecting a user selection of one of the candidate collage templates;
   in response to the user selection, rendering the user-selected collage template in the graphical user interface;
   generating a first collage using the user-selected collage template after receiving a user-selected picture for a predefined location in the user-selected collage template;
   generating a configuration file used for describing the first collage; and
   submitting the first collage and the configuration file to the social networking application, wherein the social networking application is configured to forward the first collage and the configuration file to another member of the chat group when there are one or more blank sections in the first collage and the other member of the chat group is configured to update the first collage by adding at least one picture to one of the one or more blank sections until there is no blank section in the first collage.

2. The method according to claim 1, wherein the first collage and the configuration file are provided to the other member of the chat group in the form of an instant message specifically directed to the other member of the chat group.

3. The method according to claim 2, wherein the other member of the chat group is randomly selected by the social networking application from members of the chat group that have not added pictures to the first collage or refused to add pictures to the first collage.

4. The method according to claim 2, wherein the other member of the chat group is chosen by the user of the terminal from a list of members of the chat group that have not added pictures to the first collage or refused to add pictures to the first collage recommended by the social networking application.

5. The method according to claim 1, wherein the first collage and the configuration file are provided in the form of a group message directed to the members of the chat group that have not added pictures to the first collage or refused to add pictures to the first collage recommended by the social networking application.

6. The method according to claim 5, wherein the social networking application is configured to grant permission to a first one of the members of the chat group that opens the group message for adding pictures to the first collage.

7. The method according to claim 1, wherein the social networking application is configured to send the first collage to an intended recipient in the form of an instant message after there is no blank section in the first collage.

8. The method according to claim 1, wherein the social networking application is configured to send the first collage to each member of the chat group in the form of a group message after there is no blank section in the first collage.

9. The method according to claim 1, wherein the configuration file comprises a type identifier of the target collage template and a position identifier of the at least one picture in the target collage template in the first collage, wherein the type identifier is used for indicating that a type of the target collage template is a fixed-value template type or a non-fixed-value template type, a total quantity of sections in a template of the fixed-value template type is a fixed value, a total quantity of sections in a template of the nonfixed-value template type is a nonfixed value, and the nonfixed value is less than or equal to a preset threshold.

10. A terminal for creating a collage among members of a chat group of a social networking application, the terminal comprising:
   one or more processors;
   a display;
   memory; and a plurality of programs stored in the memory, the plurality of programs including an image processing application associated with the social networking application that, when executed by the one or more processors, cause the terminal to perform the following operations:

detecting a request from a user of the terminal for creating a collage, wherein the user is a member of the chat group of the social networking application;

in response to the user request, rendering a graphical user interface on the display of the terminal, the graphical user interface including a plurality of candidate collage templates;

detecting a user selection of one of the candidate collage templates;

in response to the user selection, rendering the user-selected collage template in the graphical user interface;

generating a first collage using the user-selected collage template after receiving a user-selected picture for a predefined location in the user-selected collage template;

generating a configuration file used for describing the first collage; and submitting the first collage and the configuration file to the social networking application, wherein the social networking application is configured to forward the first collage and the configuration file to another member of the chat group when there are one or more blank sections in the first collage and the other member of the chat group is configured to update the first collage by adding at least one picture to one of the one or more blank sections until there is no blank section in the first collage.

11. The terminal according to claim 10, wherein the first collage and the configuration file are provided to the other member of the chat group in the form of an instant message specifically directed to the other member of the chat group.

12. The terminal according to claim 11, wherein the other member of the chat group is randomly selected by the social networking application from members of the chat group that have not added pictures to the first collage or refused to add pictures to the first collage.

13. The terminal according to claim 11, wherein the other member of the chat group is chosen by the user of the terminal from a list of members of the chat group that have not added pictures to the first collage or refused to add pictures to the first collage recommended by the social networking application.

14. The terminal according to claim 10, wherein the first collage and the configuration file are provided in the form of a group message directed to the members of the chat group that have not added pictures to the first collage or refused to add pictures to the first collage recommended by the social networking application.

15. The terminal according to claim 14, wherein the social networking application is configured to grant permission to a first one of the members of the chat group that opens the group message for adding pictures to the first collage.

16. The terminal according to claim 10, wherein the social networking application is configured to send the first collage to an intended recipient in the form of an instant message after there is no blank section in the first collage.

17. The terminal according to claim 10, wherein the social networking application is configured to send the first collage to each member of the chat group in the form of a group message after there is no blank section in the first collage.

18. The terminal according to claim 10, wherein the configuration file comprises a type identifier of the target collage template and a position identifier of the at least one picture in the target collage template in the first collage, wherein the type identifier is used for indicating that a type of the target collage template is a fixed-value template type or a nonfixed-value template type, a total quantity of sections in a template of the fixed-value template type is a fixed value, a total quantity of sections in a template of the nonfixed-value template type is a nonfixed value, and the nonfixed value is less than or equal to a preset threshold.

19. A non-transitory computer storage medium in connection with a terminal having one or more processors and a display, storing a plurality of programs, wherein the plurality of programs, when executed by the one or more processors, cause the terminal to perform the following plurality of operations:

detecting a request from a user of the terminal for creating a collage, wherein the user is a member of the chat group of the social networking application;

in response to the user request, rendering a graphical user interface on the display of the terminal, the graphical user interface including a plurality of candidate collage templates;

detecting a user selection of one of the candidate collage templates;

in response to the user selection, rendering the user-selected collage template in the graphical user interface;

generating a first collage using the user-selected collage template after receiving a user-selected picture for a predefined location in the user-selected collage template;

generating a configuration file used for describing the first collage; and submitting the first collage and the configuration file to the social networking application, wherein the social networking application is configured to forward the first collage and the configuration file to another member of the chat group when there are one or more blank sections in the first collage and the other member of the chat group is configured to update the first collage by adding at least one picture to one of the one or more blank sections until there is no blank section in the first collage.

* * * * *